(12) United States Patent
Kumabe

(10) Patent No.: US 10,332,321 B2
(45) Date of Patent: *Jun. 25, 2019

(54) IN-VEHICLE UNIT AND IN-VEHICLE UNIT DIAGNOSIS SYSTEM

(71) Applicant: DENSO CORPORATION, Kariya, Aichi-pref. (JP)

(72) Inventor: Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 56 days.

This patent is subject to a terminal disclaimer.

(21) Appl. No.: 15/537,192

(22) PCT Filed: Dec. 22, 2015

(86) PCT No.: PCT/JP2015/006364
§ 371 (c)(1),
(2) Date: Jun. 16, 2017

(87) PCT Pub. No.: WO2016/110915
PCT Pub. Date: Jul. 14, 2016

(65) Prior Publication Data
US 2017/0352201 A1 Dec. 7, 2017

(30) Foreign Application Priority Data
Jan. 9, 2015 (JP) ................. 2015-003462

(51) Int. Cl.
*G07C 5/00* (2006.01)
*G07C 5/08* (2006.01)
*H04L 29/08* (2006.01)

(52) U.S. Cl.
CPC ........... *G07C 5/008* (2013.01); *G07C 5/0816* (2013.01); *G07C 5/0825* (2013.01); *H04L 67/12* (2013.01)

(58) Field of Classification Search
CPC ......... G07C 5/085; G07C 5/008; H04W 4/80; H04W 4/04; H04W 88/02; H04L 67/12
See application file for complete search history.

(56) References Cited

U.S. PATENT DOCUMENTS

2013/0088369 A1    4/2013  Yu et al.
2017/0352201 A1*  12/2017  Kumabe ............... G07C 5/008

FOREIGN PATENT DOCUMENTS

JP       2007048302 A    2/2007
JP       2010126130 A    6/2010
(Continued)

OTHER PUBLICATIONS

Hattori et al., Development and Evaluation of ITS Information Communication System for Electric Vehicle, 2012, IEEE, pp. 1-6 (Year: 2012).*

(Continued)

*Primary Examiner* — McDieunel Marc
(74) *Attorney, Agent, or Firm* — Harness, Dickey & Pierce, P.L.C.

(57) ABSTRACT

An in-vehicle unit used in each of host vehicles including a subject vehicle and nearby vehicles communicates information using inter-vehicle communication, generates an index data-item including an index value indicating an operational situation of a sensor instrument based on a detection result from the sensor instrument, and transmits the generated index data-item via the wireless communicator. A subject in-vehicle unit used in the subject vehicle includes: a communication processing section that acquires the index data-item from nearby in-vehicle units; a determination criterion specification section successively specifies a different-unit determination criterion based on the acquired index data-item; and a different-unit diagnosis test section that determines whether a sensor instrument in a target nearby in-vehicle unit operates normally, by comparing the different- (Continued)

unit determination criterion with the index data-item acquired from the target nearby in-vehicle unit.

9 Claims, 5 Drawing Sheets

(56) References Cited

FOREIGN PATENT DOCUMENTS

| | | |
|---|---|---|
| JP | 2013084236 A | 5/2013 |
| JP | 2013109746 A | 6/2013 |

OTHER PUBLICATIONS

Li et al., VehicleView: a universal system for vehicle performance monitoring and analysis based on VANETs, 2012, IEEE, pp. 90-96 (Year: 2012).*
Ellison et al., The car as an Internet-enabled device, or how to make trusted networked cars, 2012, IEEE, pp. 1-8 (Year: 2012).*
Takatori et al., A study of driving assistance system based on a fusion network of inter-vehicle communication and in-vehicle external sensors, 2011, IEEE, pp. 254-259 (Year: 2011).*
Hawas et al., Infrastructureless Inter-Vehicular Real-Time Route Guidance, 2008, IEEE, p. 1213-1219 (Year: 2008).*
Dietzel et al., In-Network Aggregation for Vehicular Ad Hoc Networks, 2014, IEEE, p. 1909-1932 (Year: 2014).*
U.S. Appl. No. 15/537,217, filed Jun. 16, 2017, Kumabe.
U.S. Appl. No. 15/537,252, filed Jun. 16, 2017, Kumabe.

* cited by examiner

IN-VEHICLE UNIT AND IN-VEHICLE UNIT DIAGNOSIS SYSTEM

CROSS REFERENCE TO RELATED APPLICATIONS

This application is a U.S. National Phase Application under 35 U.S.C. 371 of International Application No. PCT/JP2015/006364 filed on Dec. 22, 2015 and published in Japanese as WO 2016/110915 A1 on Jul. 14, 2016. This application is based on and claims the benefit of priority from Japanese Patent Application No. 2015-003462 filed on Jan. 9, 2015. The entire disclosures of all of the above applications are incorporated herein by reference.

TECHNICAL FIELD

The present disclosure relates to an in-vehicle unit and an in-vehicle unit diagnosis system that diagnose whether an in-vehicle unit itself or other nearby in-vehicle units normally operate.

BACKGROUND ART

Recently, there is proposed a system in which an in-vehicle unit mounted on each of a plurality of vehicles (referred to as host vehicles) wirelessly communicates with other in-vehicle units existing within a predetermined range from the in-vehicle unit itself without using a wide area communication network. This type of communication between in-vehicle units is generally referred to as an inter-vehicle communication.

This type of in-vehicle unit includes a positioning radio wave receiver and a sensor. The positioning radio wave receiver such as a GPS receiver receives a radio wave from a positioning satellite to specify a current position of the in-vehicle unit itself. The sensor, namely an acceleration sensor or a gyro sensor, detects a predetermined physical state quantity such as an acceleration or a rotational angular speed. A detection result from the acceleration sensor or the gyro sensor is used to correct a current position specified by the positioning radio wave receiver. The in-vehicle unit may include a sensor to detect a physical state quantity such as illuminance and temperature in addition to an acceleration or a rotational angular speed.

The in-vehicle unit transmits information about the in-vehicle unit itself such as a current position and an acceleration of the in-vehicle unit itself to a service provider terminal (e.g., a roadside instrument) that provides the in-vehicle unit with a predetermined service. The in-vehicle unit can thereby obtain a service provided by the service provider terminal. For example, the in-vehicle unit provides the service provider terminal with current position information and can thereby obtain a service associated with the current position.

Patent literature 1 discloses the technology that settles a predetermined threshold value as an operation range of an acceleration sensor and uses the threshold value to diagnose whether the acceleration sensor operates normally.

PRIOR ART LITERATURES

Patent Literature

Patent literature 1: JP 2007-048302 A

SUMMARY OF INVENTION

The in-vehicle unit includes a sensor such as an acceleration sensor or a gyro sensor that may malfunction. In such a case, the service provider terminal is supplied with incorrect information about a current position, for example. Specifically, the current position may be estimated differently from the actual position when the acceleration sensor or the gyro sensor malfunctions. The in-vehicle unit may not be able to appropriately obtain the service provided from the service provider terminal.

The quality of services the in-vehicle unit obtains greatly depends on whether various sensors in the in-vehicle unit operate normally. It is therefore favorable to diagnose as needed whether various sensors in the in-vehicle unit operate normally.

As described in patent literature 1, an operation tendency (such as an operation range) of the sensor in the in-vehicle unit may be already known. In such a case, a threshold value appropriate for the operation tendency can be settled. The threshold value can be used to determine whether the sensor operates normally.

However, it is difficult to specify the operation tendency of various sensors (such as the acceleration sensor) used for the in-vehicle unit because an exterior environment to use the in-vehicle unit varies dynamically. The exterior environment here signifies elements that influence detection values from the sensors. The exterior environment mainly includes a surface shape of a road traveled by the host vehicle, a road shape (curvature), a road gradient, a possibility of travel on a bridge, a period of day, and weather.

It may be therefore difficult to previously or uniquely specify a threshold value to indicate whether the sensors provided for the in-vehicle unit operate normally. A specific example of the above will be described while a vehicle mounted with a given in-vehicle unit is hereinafter referred to as a host vehicle and the acceleration sensor is used as an example of the sensors provided for the in-vehicle unit.

Suppose that the host vehicle travels a flat road. In such a case, a vehicle body generates a relatively small vibration and a vertical force barely acts on the in-vehicle unit. The acceleration sensor is therefore less likely to detect a vertical acceleration. The acceleration sensor therefore may not operate normally when the acceleration sensor detects a vertical acceleration greater than or equal to a predetermined value even though the host vehicle travels a flat road. The vertical direction here signifies a direction in which the gravity acts.

In contrast, a relatively large vertical force acts on the in-vehicle unit when the host vehicle travels a rough road or on a bridge. The acceleration sensor also outputs a vertical acceleration. The magnitude of the detected acceleration depends on an exterior environment such as a traveled road.

The situation in which the acceleration sensor detects a vertical acceleration signifies a normal operation when the host vehicle travels a rough road. However, the same situation signifies an occurrence of malfunction when the host vehicle travels a flat road.

A configuration that uses a fixed threshold value to diagnose whether the acceleration sensor operates normally may incorrectly determine that the acceleration sensor does not operate normally when the actual exterior environment differs from a situation assumed to predetermine the threshold value. The example here describes the relation between the operation of the acceleration sensor and the exterior environment. However, the same applies to sensors that detect the other physical state quantities.

The in-vehicle unit may be able to acquire information about an exterior environment that influences the sensor operational situation. In such a case, the use of a threshold value corresponding to the exterior environment can determine whether the sensor operates normally.

However, acquisition of the information to indicate the exterior environment requires separately adding a specific configuration to the in-vehicle unit, thus increasing costs. A threshold value to determine whether the operation is normal or abnormal needs to be specified correspondingly to each of estimated exterior environments, thus increasing labor hours for the software design. Even a normal operation may be incorrectly determined to be abnormal when the host vehicle travels under an unexpected environment.

It is an object of the present disclosure to provide an in-vehicle unit and an in-vehicle unit diagnosis system capable of diagnosing normal or abnormal operation of a sensor in an in-vehicle unit without using information about an exterior environment.

To achieve the above object, according to a first example of the present disclosure, an in-vehicle unit used in each of a plurality of host vehicles including a subject vehicle and a plurality of nearby vehicles near the subject vehicle is provided as follows. Each in-vehicle unit used in each host vehicle includes a wireless communicator that transmits and receives information using inter-vehicle communication, a sensor instrument that detects a predetermined physical state quantity acting on each in-vehicle unit, and an index data generation section that generates an index data-item including an index value indicating an operational situation of the sensor instrument based on a detection result from the sensor instrument, the generated index data-item being transmitted via the wireless communicator. The in-vehicle unit used in the subject vehicle (referred to as a subject in-vehicle unit) includes a communication processing section, a determination criterion specification section, and a different-unit diagnosis test section. The communication processing section makes the wireless communicator acquire a different-unit index data-item as the index data-item transmitted from the nearby vehicles (or the in-vehicle units in the nearby vehicles which are also referred to as nearby in-vehicle units). The determination criterion specification section successively specifies a different-unit determination criterion as a determination criterion to determine whether a different sensor instrument as the sensor instrument included in a target nearby in-vehicle unit operates normally, based on the different-unit index data-item acquired by the communication processing section, the target nearby in-vehicle unit serving as a predetermined diagnosis target among the nearby in-vehicle units. The different-unit diagnosis test section determines whether the different sensor instrument in the target nearby in-vehicle unit operates normally, by comparing the different-unit determination criterion specified by the determination criterion specification section with the different-unit index data-item acquired by the communication processing section from the target nearby in-vehicle unit.

According to the above-mentioned configuration, the determination criterion specification section uses an index data-item received from the nearby in-vehicle unit and successively specifies a determination criterion to determine whether a sensor instrument operates normally when the sensor instrument is included in a vehicle or an in-vehicle unit as a diagnosis target out of nearby in-vehicle units. The different-unit diagnosis test section uses the determination criterion specified by the determination criterion specification section to determine whether the sensor instrument in the in-vehicle unit as a diagnosis target operates normally.

The in-vehicle unit as a diagnosis target and the nearby in-vehicle unit to have supplied the index data-item as an origin of generating the determination criterion exist in a range capable of inter-vehicle communication with the subject in-vehicle unit, namely, a relatively small range.

The exterior environment, such as a surface shape of a road traveled by each vehicle, a road shape (curvature), a road gradient, a possibility of travel on a bridge, a period of day, and weather, influences detection values of sensor instruments. The exterior environment is highly likely to be applicable to the nearby in-vehicle unit and the subject in-vehicle unit in common because any of nearby in-vehicle units exists in a relatively small range.

The exterior environment therefore similarly influences the in-vehicle unit as a diagnosis target and the in-vehicle unit to have supplied the index data-item as an origin of generating the determination criterion. Thus, the exterior environment similarly influences the index data-item for a sensor instrument in the in-vehicle unit to be diagnosed and the index data-item as an origin of determining the determination criterion.

Namely, the determination criterion dynamically specified by the determination criterion specification section reflects the influence of the exterior environment. Vehicle existing in a nearby area are expected to behave similarly. Operational situations of sensor instruments in a plurality of nearby in-vehicle units are therefore also expected to be similar to each other. That is, a sensor instrument in the in-vehicle unit as a diagnosis target is assumed to be unlikely to operate normally when the operational situation of this sensor instrument differs from the operational situation of a sensor instrument in each of the nearby in-vehicle units.

The above-mentioned configuration does not use information to prescribe the exterior environment influencing operations of the sensor instrument in order to specify the determination criterion. The configuration can therefore diagnose whether the sensor instrument in the in-vehicle unit operates normally, without using information about the exterior environment.

To achieve the above object, according to a second example of the present disclosure, an in-vehicle unit used in each of a plurality of host vehicles including a subject vehicle and at least one nearby vehicle near the subject vehicle is provided as follows. Each in-vehicle unit used in each host vehicle includes a wireless communicator that transmits and receives information using inter-vehicle communication, a sensor instrument that detects a predetermined physical state quantity acting on each in-vehicle unit, and an index data generation section that generates an index data-item including an index value indicating an operational situation of the sensor instrument based on a detection result from the sensor instrument, the generated index data-item being transmitted via the wireless communicator. The in-vehicle unit used in the subject vehicle (referred to as a subject in-vehicle unit) includes a communication processing section, a determination criterion specification section, and a self-unit diagnosis test section. The communication processing section makes the wireless communicator acquire a different-unit index data-item as the index data-item transmitted from at least one nearby vehicle (or at least one nearby in-vehicle unit). The determination criterion specification section successively specifies a self-unit determination criterion as a determination criterion to determine whether the sensor instrument in the subject in-vehicle unit operates normally, based on the different-unit index data-item acquired by the communication processing section. The self-unit diagnosis test section determines whether the sensor instrument in the subject in-vehicle unit operates normally, by comparing the self-unit determination criterion specified by the determination criterion specification section with a self-unit index data-item as the index data-item in the subject in-vehicle unit.

The configuration conforms to a mechanism similar to the first example of the in-vehicle unit and can diagnose whether the sensor instrument in the subject in-vehicle unit operates normally, without using information about the exterior environment.

Further, according to a third example of the present disclosure, an in-vehicle diagnosis system having a plurality of in-vehicle units respectively provided in a plurality of host vehicles that include a subject vehicle and at least one nearby vehicle near the subject vehicle is provided as follows. Each in-vehicle unit includes a wireless communicator that transmits and receives information using inter-vehicle communication, a sensor instrument that detects a predetermined physical state quantity acting on each in-vehicle unit, and an index data generation section that generates an index data-item including an index value indicating an operational situation of the sensor instrument based on a detection result from the sensor instrument. The in-vehicle unit further includes a communication processing section, a determination criterion specification section, and a different-unit diagnosis test section. The communication processing section makes the wireless communicator transmit the generated index data-item and acquire a different-unit index data-item as the index data-item transmitted from at least one nearby in-vehicle unit as the in-vehicle unit in the at least one nearby vehicle. The determination criterion specification section successively specifies a different-unit determination criterion as a determination criterion to determine whether a different sensor instrument as the sensor instrument included in a target nearby in-vehicle unit operates normally, based on the different-unit index data-item acquired by the communication processing section, the target nearby in-vehicle unit serving as a predetermined diagnosis target among nearby in-vehicle units. The different-unit diagnosis test section determines whether the different sensor instrument in the target nearby in-vehicle unit operates normally, by comparing the different-unit determination criterion specified by the determination criterion specification section with the different-unit index data-item acquired by the communication processing section from the target nearby in-vehicle unit.

An example of the in-vehicle unit diagnosis system is embodied by including a plurality of in-vehicle units according to the above-mentioned configuration as the first example of an in-vehicle unit. Namely, the mechanism similar to the first example of the above-mentioned in-vehicle unit enables each in-vehicle unit in the system to diagnose whether a sensor instrument in a different in-vehicle unit operates normally, without using information about the exterior environment.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
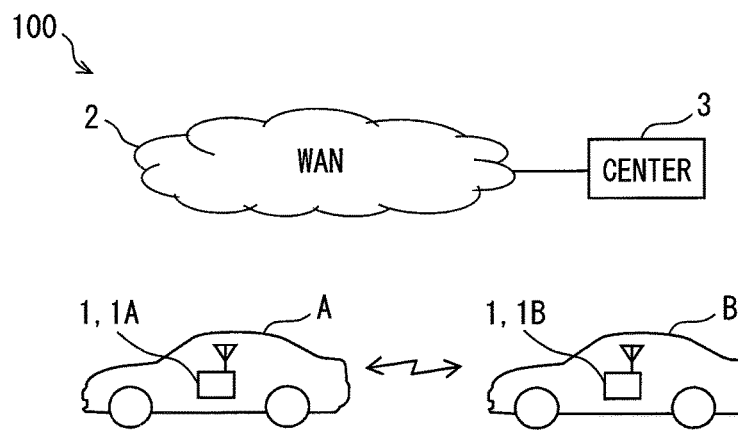
FIG. 1 is a block diagram illustrating a schematic configuration of an in-vehicle unit diagnosis system according to an embodiment.

An embodiment of the present invention will be described in further detail with reference to the accompanying drawings. FIG. 1 is a drawing illustrating an example of a schematic configuration of an in-vehicle unit diagnosis system 100 according to the present disclosure. The in-vehicle unit diagnosis system 100 includes an in-vehicle unit 1 and a center 3. One in-vehicle unit 1 is used for each of a plurality of vehicles. The center 3 is provided outside each vehicle. The center 3 is connected to a wide area communication network 2 such as a telephone network or the Internet. The in-vehicle unit 1 is mounted on vehicles denoted by reference symbols A and B in FIG. 1.

The in-vehicle unit 1 mounted on each vehicle uses a radio wave at a previously allocated frequency band to perform wireless communication (so-called inter-vehicle communication) with another in-vehicle unit 1 existing in the neighborhood of self terminal without using the wide area communication network 2. The inter-vehicle communication uses radio waves at frequency bands such as 700 MHz, 5.8 through 5.9 GHz, and 2.4 GHz.

The neighborhood of self terminal signifies a range capable of the inter-vehicle communication. The range capable of the inter-vehicle communication or vehicle roadside communication may be appropriately designed. The range is often designed as several tens to hundreds of meters. Another in-vehicle unit 1 existing in the neighborhood of self terminal will be also described as a nearby in-vehicle unit 1.

Vehicle A is also referred to as a target (subject) vehicle or a first vehicle. Vehicle B is also referred to as a nearby vehicle, a different vehicle, or a second vehicle. The in-vehicle unit diagnosis system 100 and the in-vehicle unit 1 will be described below. A nearby vehicle B signifies a vehicle mounted with the in-vehicle unit 1 (also referred to as a different in-vehicle unit) that performs inter-vehicle communication with the in-vehicle unit 1 mounted on a subject vehicle A. The subject vehicle or the nearby vehicle signifies relative relationship. Assume that vehicle B to be a subject vehicle. Vehicle A is then assumed to be a nearby vehicle for vehicle B. A vehicle mounted with the in-vehicle unit 1 is also referred to as a host vehicle. This also applies to vehicles A and B.

The drawing illustrates only one vehicle corresponding to the nearby vehicle B. However, at least one or a plurality of vehicles may correspond to the nearby vehicle B. There may be a plurality of the in-vehicle units 1 accordingly each mounted on the nearby vehicle B. The in-vehicle unit 1 mounted on nearby vehicle A may need to be distinguished from the in-vehicle unit 1 mounted on the nearby vehicle B. In such a case, the in-vehicle unit 1 mounted on the subject vehicle A is defined as in-vehicle unit 1A and is also referred to as a first in-vehicle unit 1A or a subject in-vehicle unit 1A. The in-vehicle unit 1 mounted on a nearby vehicle is defined as in-vehicle unit 1B (i.e., a nearby in-vehicle unit) and is also referred to as a second in-vehicle unit 1B or a different in-vehicle unit 1B.

Each in-vehicle unit 1 may use a radio wave at a previously allocated frequency band to perform the wireless communication (so-called vehicle roadside communication) with a roadside instrument provided on or along a road without using the wide area communication network 2. Each in-vehicle unit 1 performs inter-vehicle communication or vehicle roadside communication in compliance with a publicly known communication standard to perform the inter-vehicle communication or the vehicle roadside communication. For example, the in-vehicle unit 1 performs the inter-vehicle communication or the vehicle roadside communication in compliance with the standard of IEEE1609.0 (Guide for Wireless Access in Vehicular Environment). In the description below, simply a communication terminal signifies the in-vehicle unit 1 and the roadside instrument that are not distinguished, if applicable.

Each of the communication terminals (such as the in-vehicle unit 1 and the roadside instrument) included in the in-vehicle unit diagnosis system 100 is assigned an identification code (referred to as a terminal ID) to identify each of a plurality of communication terminals. Data transmitted by each communication terminal includes the terminal ID of a transmitter terminal. The communication that receives the data can specify the transmitter terminal based on the terminal ID in the data.

(Overview of the in-Vehicle Unit Diagnosis System 100)

The in-vehicle unit diagnosis system 100 is overviewed below. Each of a plurality of the in-vehicle units 1 in the in-vehicle unit diagnosis system 100 includes a sensor (such as an acceleration sensor or a gyro sensor) also referred to as a sensor instrument to detect a predetermined physical state quantity such as an acceleration or a rotational angular speed that acts on a self terminal. The sensor used for the subject vehicle A is also referred to as a sensor instrument. The sensor used for the nearby vehicle B is also referred to as a different sensor instrument. Each in-vehicle unit 1 uses the inter-vehicle communication to transmit data (index data-item to be described later) indicating operational situations of various sensors in the self terminal and receives an index data-item transmitted from the different in-vehicle unit 1 existing near the self terminal. Namely, the in-vehicle unit 1A transmits an index data-item (also referred to as a self-unit index data-item) of the self terminal and receives an index data-item (also referred to as a different-unit index data-item) transmitted from the nearby in-vehicle unit 1B.

The subject vehicle A and the nearby vehicle B travel under an approximately equal environment. Moreover, the nearby vehicle B is highly likely to exhibit a behavior (such as acceleration, deceleration, or turn) that is strongly similar to the subject vehicle A. Operational situations (such as detection values) of sensors in the in-vehicle unit 1A are therefore expected to be strongly similar to operational situations of sensors in the nearby in-vehicle unit 1B. The environment under which the vehicle travels includes a surface shape of a traveled road, a surface shape of a traveled road, a road curvature, a road gradient, a period of day, and weather.

Based on the above-mentioned tendency, the in-vehicle unit 1 of the in-vehicle unit diagnosis system 100 diagnoses a sensor in the self terminal or a sensor in the nearby in-vehicle unit 1B by comparing the operational situation of the sensor in the self terminal with the operational situation of the sensor in the different in-vehicle unit 1. The diagnosis here signifies determination whether various sensors operate normally.

(Configuration of the in-Vehicle Unit 1)

Figure 2:
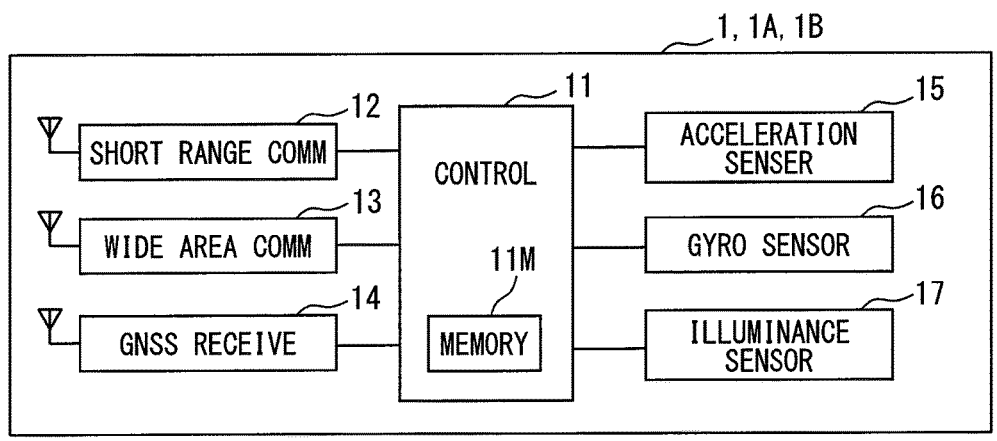
FIG. 2 is a block diagram illustrating a schematic configuration of an in-vehicle unit according to the embodiment.

The description below explains a schematic configuration of the in-vehicle unit 1 with reference to FIG. 2. As in FIG. 2, the in-vehicle unit 1 includes a controller 11, a short range communicator 12, a wide area communicator 13, a GNSS receiver 14, an acceleration sensor 15, a gyro sensor 16, and an illuminance sensor 17. The controller 11 is connected to each of the short range communicator 12, the wide area communicator 13, the GNSS receiver 14, the acceleration sensor 15, the gyro sensor 16, and the illuminance sensor 17 so as to be capable of intercommunication.

The short range communicator 12 includes an antenna capable of transmitting and receiving radio waves at frequencies used for the inter-vehicle communication or the vehicle roadside communication. The short range communicator 12 uses the antenna to wirelessly communicate with a different communication terminal (the in-vehicle unit 1 or the roadside instrument) existing near the self terminal. More specifically, the short range communicator 12 demodulates a signal received by the antenna and outputs the signal to the controller 11. The short range communicator 12 also modulates data input from the controller 11, converts the data into a radio wave, and transmits the radio wave. The short range communicator 12 is also referred to as a wireless communicator.

The wide area communicator 13 connects to the wide area communication network 2 and communicates with the center 3. The wide area communicator 13 demodulates a signal received via the wide area communication network 2 and supplies the signal to the controller 11. The wide area communicator 13 also modulates a baseband signal input from the controller 11 and transmits the signal to the center 3.

The GNSS receiver 14 receives a radio wave from a satellite (referred to as a GNSS satellite) used for GNSS (Global Navigation Satellite System) and thereby acquires information indicating a current position of the GNSS receiver 14. The current position acquired by the GNSS receiver 14 may be represented by a latitude, a longitude, and an altitude. The altitude may be assumed to represent a height from a predetermined reference level (e.g., sea surface). The information is used as being not only uncountable but also countable.

The controller 11 is successively (e.g., every 100 milliseconds) provided with the position information acquired by the GNSS receiver 14. The GNSS receiver 14 according to the embodiment is an optional element and may be omitted. The GNSS receiver 14 is also referred to as a position information output interface.

The acceleration sensor 15 is provided as a triaxial acceleration sensor to detect an acceleration that acts in three mutually orthogonal axis directions. The three axis directions to detect an acceleration are denoted as an X-axis direction, a Y-axis direction, and a Z-axis direction, for convenience sake. As an example, suppose that the in-vehicle unit 1 is attached to the vehicle according to a predetermined posture. In such a case, the X-axis direction corresponds to the front-back direction of the vehicle. The Y-axis direction corresponds to the vehicle width direction. The Z-axis direction corresponds to the height direction.

The acceleration sensor 15 detects accelerations correspondingly to the axis directions. Data representing the acceleration is successively output to the controller 11. An interval (output interval) to output a detection value from the acceleration sensor 15 may be appropriately designed such as 100 milliseconds. Obviously, the output interval may be set to the other values such as 50 milliseconds or 200 milliseconds. The acceleration sensor 15 in this example is provided as a triaxial acceleration sensor, but is not limited to be triaxial.

The gyro sensor 16 detects a rotational angular speed around a vertical axis of the vehicle under condition that the in-vehicle unit 1 is attached to the vehicle according to a predetermined posture. A detection value from the gyro sensor 16 is successively output to the controller 11 at a predetermined output interval.

The illuminance sensor 17 detects the brightness (i.e., illuminance) around the self terminal. The illuminance sensor 17 outputs a signal corresponding to the detected illuminance. A detection value from the illuminance sensor 17 is also successively output to the controller 11 at a predetermined output interval.

In the description below, simply a sensor signifies the acceleration sensor 15, the gyro sensor 16, and the illuminance sensor 17 in the self terminal when the sensors are not distinguished. A sensor in the self terminal is referred to as a self sensor when the sensor in the self terminal is distinguished from the sensor in the different in-vehicle unit 1.

The controller 11 is also referred to as an electronic controller unit or a controller circuit. According to the embodiment, the controller 11 is configured as an ordinary computer that includes a known CPU, nonvolatile memory such as ROM or flash memory, volatile memory such as RAM, I/O, and a bus line to connect these components though none of these are illustrated.

Memory 11M in the controller 11 includes a nonvolatile storage area and a rewritable storage area and is available as the flash memory, ROM, or RAM in the controller 11, for example. The nonvolatile storage area of the memory 11M stores a program module or data to perform various processes and the terminal ID assigned to the in-vehicle unit 1.

The rewritable storage area of the memory 11M stores a detection result from the self sensor, index data-item dependent on the detection result, and index data-item acquired from the different in-vehicle unit 1. The rewritable storage area stores these contents for a predetermined time period from the most recent one.

Figure 3:
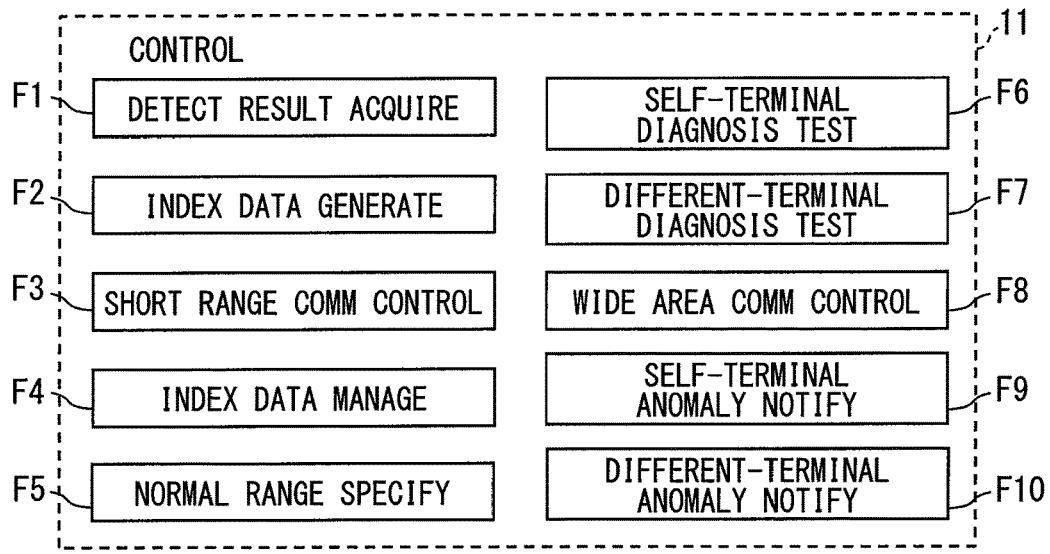
FIG. 3 is a block diagram illustrating a schematic configuration of a controller.

The controller 11 according to the embodiment performs the above-mentioned program module to implement function blocks as in FIG. 3 such as a detection result acquisition section F1 (also referred to as a detection result acquirer), an index data generation section F2 (also referred to as an index data generator), a short range communication control section F3 (also referred to as a short range communication controller), an index data management section F4 (also referred to as an index data manager), a normal range specification section F5 (also referred to as a normal range specifier), a self-terminal diagnosis test section F6 (also referred to as a self-terminal diagnosis tester), a different-terminal diagnosis test section F7 (also referred to as a different-terminal diagnosis tester), a wide area communication control section F8 (also referred to as a wide area communication controller), a self-terminal anomaly notification section F9 (also referred to as a self-terminal anomaly notifier), and a different-terminal anomaly notification section F10 (a different-terminal anomaly notifier). All or part of the functions performed by the controller 11 may be configured as one or more IC modules as hardware.

The detection result acquisition section F1 successively acquires a detection value successively output from the self sensor. Namely, the detection result acquisition section F1 successively acquires an acceleration corresponding to each axis direction output from the acceleration sensor 15, a rotational angular speed output from the gyro sensor 16, and an illuminance output from the illuminance sensor 17.

Various acquired detection values are classified correspondingly to the sensors as output sources of the detection values and are chronologically stored in the rewritable storage area of the memory 11M. The detection value at each time point, when stored, is supplied with information (referred to as a time stamp) capable of identifying the time corresponding to the time point to acquire the detection value.

The other function units can reference the memory 11M. Each function unit can perform a process using chronological data that is stored in the memory 11M and is provided as a detection result from each sensor.

Figure 4:
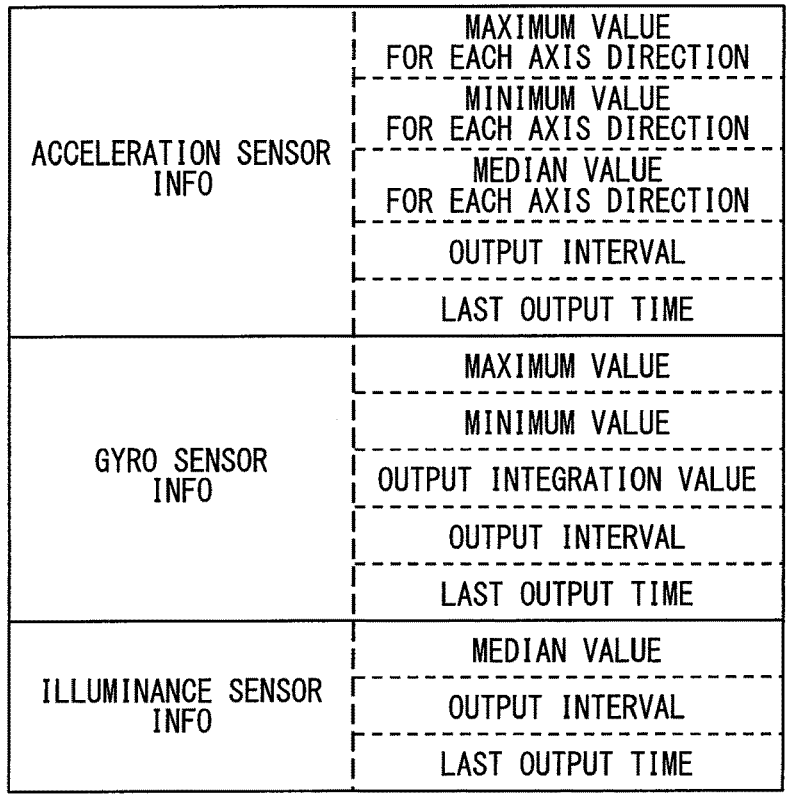
FIG. 4 is a diagram illustrating an example of a schematic configuration of index data-items.

The index data generation section F2 generates an index data-item indicating the feature of an operational situation of each sensor using chronological data that is stored in the memory 11M and is provided as a detection result from each sensor. As in FIG. 4, for example, the index data-item includes: acceleration sensor information about an operational situation of the acceleration sensor 15; acceleration sensor information about an operational situation of the gyro sensor 16; and acceleration sensor information about an operational situation of the illuminance sensor 17.

The acceleration sensor information includes various index values indicating operational situations of the acceleration sensor 15. For example, the acceleration sensor information is assumed to include maximum, median, and minimum detection values from the acceleration sensor 15 corresponding to each axis direction within a predetermined first time period from the current time point, a detection result output interval, and the time (last output time) to output the last detection result.

The first time period may be designed appropriately. For example, the first time period is favorably set to be sufficiently long in comparison with the output interval of the acceleration sensor 15. The first time period may be 10 times (one second in this example) as long as the output interval. The first time period may be set to the other values such as five seconds. The median used in this example signifies that used in statistics.

The gyro sensor information includes various index values indicating operational situations of the gyro sensor 16. The gyro sensor information includes maximum and minimum detection values and an output integration value from the gyro sensor 16 within the first time period from the current time point, a detection result output interval, and the last output time.

The output integration value is generated by integrating a detection value from the gyro sensor 16 within a predetermined second time period from the current time point. The second time period is also favorably set to be sufficiently long in comparison with the output interval and to be longer than the first time period. The output integration value represents an angle of change in the movement direction of the in-vehicle unit 1 when the in-vehicle unit 1 is mounted according to a predetermined posture. Excessively shortening the second time period decreases the angle of change in the movement direction. A self-terminal diagnosis process or a different-terminal diagnosis process to be described later decreases the accuracy of determining whether the gyro sensor 16 is normal. The second time period is therefore favorably set to be sufficiently long, such as ten seconds, so as to be able to detect a change in the travel direction of the vehicle.

The illuminance sensor information includes various index values indicating operational situations of the illuminance sensor 17. For example, the gyro sensor information includes a median detection value from the illuminance sensor 17 within the first time period from the current time point, a detection value output interval, and the last output time.

The above-mentioned contents of the index data-item are examples and are not limited thereto. For example, the index data-item need not include all the types of index values described above. The index data-item may include types of index values not described above. For example, the index data-item may include an average value, dispersion, or standard deviation instead of various medians. The index data-item may include a detection value corresponding to each axis direction of the acceleration sensor 15 when the vehicle stops.

The index data-item generated by the index data generation section F2 is supplied with a time stamp indicating the generation time and is stored in the memory 11M. The index data-item is also supplied to the short range communication control section F3.

The time when the index data generation section F2 generates the index data-item may be designed appropriately. For example, the index data-item may be generated every predetermined time (an integral multiple of the first time period). The index data-item may be generated when the short range communication control section F3 to be described starts communication with a roadside instrument. The index data-item may be generated when receiving a signal from the different in-vehicle unit 1 to request execution of a different-terminal diagnosis process to be described that assumes the in-vehicle unit 1 or the corresponding host vehicle to be a diagnosis target.

The short range communication control section F3 controls operation of the short range communicator 12 and acquires data received by the short range communicator 12. The short range communication control section F3 outputs data to the short range communicator 12 when the data needs to be transmitted to the different in-vehicle unit 1 or the roadside instrument. The short range communication control section F3 allows the short range communicator 12 to transmit the data. Namely, the short range communication control section F3 also functions as an interface to transmit or receive data from the different in-vehicle unit 1 or the roadside instrument.

For example, the short range communication control section F3 may be supplied with an index data-item from the index data generation section F2. In such a case, the short range communication control section F3 generates transmission data including the index data-item and allows the short range communicator 12 to transmit the transmission data. The transmission data may be generated based on a data format used in the communication standard for the inter-vehicle communication. For example, the transmission data may include the index data-item supplied with a header that includes the terminal ID of the in-vehicle unit 1.

The short range communication control section F3 may acquire data including the index data-item transmitted by the different in-vehicle unit 1. In such a case, the short range communication control section F3 supplies the index data-item to the index data management section F4 in accordance with the terminal ID of the transmission source. The short range communication control section F3 is also referred to as a communication processing section or a communication processor.

The index data management section F4 is supplied with the index data-item that is supplied from the short range communication control section F3 and is transmitted from the different in-vehicle unit 1. The index data management section F4 saves the index data-item in the memory 11M so as to correspond to each in-vehicle unit 1 as the transmission source. The index data-item corresponding to each in-vehicle unit 1 may be sorted in the order of reception and saved. A past data-item saved over a predetermined time period may be successively discarded.

The normal range specification section F5 specifies a diagnosis criterion to diagnose the self sensor or a diagnosis criterion to diagnose a sensor of the different in-vehicle unit 1. The diagnosis criterion specifies the normal range of each of a plurality of predetermined diagnosis items. The normal range represents the upper limit and the lower limit of a range (normal range) in which the diagnosis item is assumed to be normal. The normal range specification section F5 is also referred to as a determination criterion specification section.

As an example, a plurality of the diagnosis items are assumed to correspond to items included in the index data-item. Namely, the diagnosis items concerning the acceleration sensor 15 signify the maximum, median, and minimum detection values corresponding to each axis direction, the output interval, and the last output time. The diagnosis items concerning the gyro sensor 16 signify the maximum and minimum detection values, the output interval, and the last output time. The diagnosis items concerning the illuminance sensor 17 signify the median, the output interval, and the last output time.

Obviously, the diagnosis items are not limited to those exemplified here. Some items (such as the output interval) may not need to be provided as the diagnosis items. The diagnosis items may include a posture angle to mount the acceleration sensor 15 as will be described later in a modification.

The normal range specification section F5 specifies a diagnosis criterion based on the index data-item received from the nearby in-vehicle unit 1. As a more favorable mode, the embodiment specifies a diagnosis criterion based on the index data-item received from the nearby in-vehicle unit 1 other than the in-vehicle unit 1 as a diagnosis target.

The diagnosis criterion to diagnose the self sensor is specified based on the index data-item received from the nearby in-vehicle unit 1B. The diagnosis criterion to diagnose a sensor for the different in-vehicle unit 1 is specified based on the index data-item received from the nearby in-vehicle unit 1 other than the nearby in-vehicle unit 1 as a diagnosis target (a target nearby in-vehicle unit, namely, the nearby in-vehicle unit 1 mounted on the nearby vehicle B as a diagnosis target). The diagnosis criterion to diagnose a sensor for the different in-vehicle unit 1 may be specified by using the index data-item for the self terminal in addition to the index data-item received from the nearby in-vehicle unit 1 other than the nearby in-vehicle unit 1 as a diagnosis target.

Operation of the normal range specification section F5 will be described later. In the description below, the diagnosis criterion to diagnose a self-terminal sensor is also referred to as a self-terminal diagnosis criterion. The diagnosis criterion to diagnose a sensor for the different in-vehicle unit 1 is also referred to as a different-terminal diagnosis criterion. The self-terminal diagnosis criterion is also referred to as a self-unit determination criterion. The different-terminal diagnosis criterion is also referred to as a different-unit determination criterion.

The self-terminal diagnosis test section F6 compares the normal range for each diagnosis item with the self-terminal index data-item and thereby determines whether the self sensor operates normally. In this case, the normal range is specified by the normal range specification section F5 and is included in the self-terminal diagnosis criterion. The self-terminal diagnosis test section F6 will be described in detail later along with the description of a flowchart in FIG. 5. The self-terminal diagnosis test section F6 is also referred to as a self-unit diagnosis test section, or a self-unit diagnosis tester.

The different-terminal diagnosis test section F7 compares the normal range for each diagnosis item with the index data-item and thereby determines whether a sensor in the diagnosis target operates normally. In this case, the normal range is determined by the normal range specification section F5 and is included in the different-terminal diagnosis criterion. The index data-item is acquired from the different in-vehicle unit 1 as a diagnosis target. The different-terminal diagnosis test section F7 will be described in detail later along with the description of a flowchart in FIG. 7. The different-terminal diagnosis test section F7 is also referred to as a different-unit diagnosis test section, or a different-unit diagnosis tester.

The wide area communication control section F8 controls operation of the wide area communicator 13 and acquires data received by the wide area communicator 13. The wide area communication control section F8 outputs data to be transmitted to the center 3 to the wide area communicator 13 and allows the wide area communicator 13 to transmit the data.

The self-terminal anomaly notification section F9 requests the wide area communication control section F8 to transmit a self-terminal anomaly notification to the center 3. The self-terminal anomaly notification is a message indicating that the self-terminal sensor does not operate normally when the self-terminal diagnosis test section F6 determines that the self sensor does not operate normally. The wide area communication control section F8 transmits the self-terminal anomaly notification to the center 3 based on the request from the self-terminal anomaly notification section F9. The self-terminal anomaly notification just needs to include a self-terminal terminal ID. As a more favorable mode, the self-terminal anomaly notification includes information indicating a sensor not operating normally or the contents of an abnormal event. The self-terminal anomaly notification section F9 is also referred to as a self-terminal anomaly notification section, or a self-unit anomaly notifier.

The different-terminal diagnosis test section F7 may determine that a sensor in the nearby in-vehicle unit 1B does not operate normally. In such a case, the different-terminal anomaly notification section F10 requests the wide area communication control section F8 to transmit a different-terminal anomaly notification to the center 3. The different-terminal anomaly notification is a message indicating that the sensor in the nearby in-vehicle unit 1B does not operate normally. The wide area communication control section F8 transmits the different-terminal anomaly notification to the center 3 based on the request from the different-terminal anomaly notification section F10. The different-terminal anomaly notification just needs to include the terminal ID of the nearby in-vehicle unit 1B as a diagnosis target. Moreover, the different-terminal anomaly notification favorably includes information indicating a sensor not operating normally or information indicating the reason for determining that the sensor does not operate normally. The different-terminal anomaly notification section F10 is also referred to as a different-unit anomaly notification section, or a different-unit anomaly notifier.

(Center 3)

The center 3 connects to the wide area communication network 2. The center 3 mutually communicates with the in-vehicle unit 1 in the in-vehicle unit diagnosis system 100 via the wide area communication network 2. Suppose the center 3 receives the self-terminal anomaly notification from the in-vehicle unit 1. In such a case, the center 3 arranges for personnel to maintain the in-vehicle unit 1. Suppose there is available data that previously associates the terminal ID of the in-vehicle unit 1 with contact information (e.g., e-mail address) about a user. In such a case, the center 3 may notify to the contact information that the sensor of the in-vehicle unit 1 does not operate normally.

The above is similar to the different-terminal anomaly notification when received. The center 3 may arrange for personnel to maintain the in-vehicle unit 1 specified in the different-terminal anomaly notification. The center 3 may notify to a user of the in-vehicle unit 1 that the sensor of the in-vehicle unit 1 in use does not operate normally.

(Self-Terminal Diagnosis Process)

Figure 5:
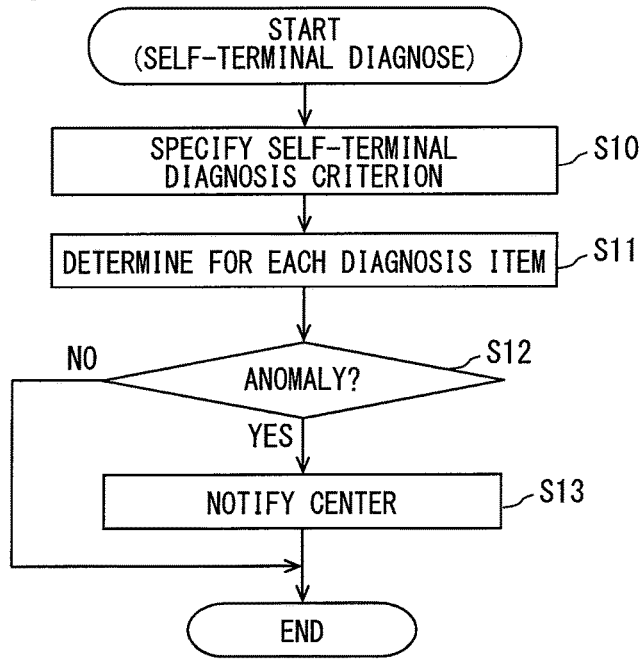
FIG. 5 is a flowchart illustrating a self-terminal diagnosis process performed by the controller.

By using a flowchart in FIG. 5, the description below explains a process (referred to as a self-terminal diagnosis process) performed by the controller 11 of the in-vehicle unit 1 to diagnose a self sensor. The description below assumes the in-vehicle unit 1A to be the subject of the process in order to distinguish between the in-vehicle unit 1 to perform the process and the different in-vehicle unit 1 for convenience sake.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, unit, or specific name (e.g., detector). Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

This flowchart may start at the moment the index data generation section F2 of the in-vehicle unit 1A generates an index data-item. It may be favorable to appropriately design a condition to start the self-terminal diagnosis process. The self-terminal diagnosis process may start when an index data-item is acquired from the different in-vehicle unit 1 (i.e., the nearby in-vehicle unit 1B), for example. Moreover, the self-terminal diagnosis process may start when the index data generation section F2 generates an index data-item while the in-vehicle unit 1A performs inter-vehicle communication with larger than or equal to a specified number of the nearby in-vehicle units 1B. Furthermore, the self-terminal diagnosis process may start when the in-vehicle unit 1A starts vehicle roadside communication with an unshown roadside instrument.

At S10, the normal range specification section F5 performs the self-terminal diagnosis criterion specification process and proceeds to S11. The self-terminal diagnosis criterion specification process at S10 specifies the normal range for each predetermined diagnosis item based on the index data-item received from the nearby in-vehicle unit 1B.

Figure 6:
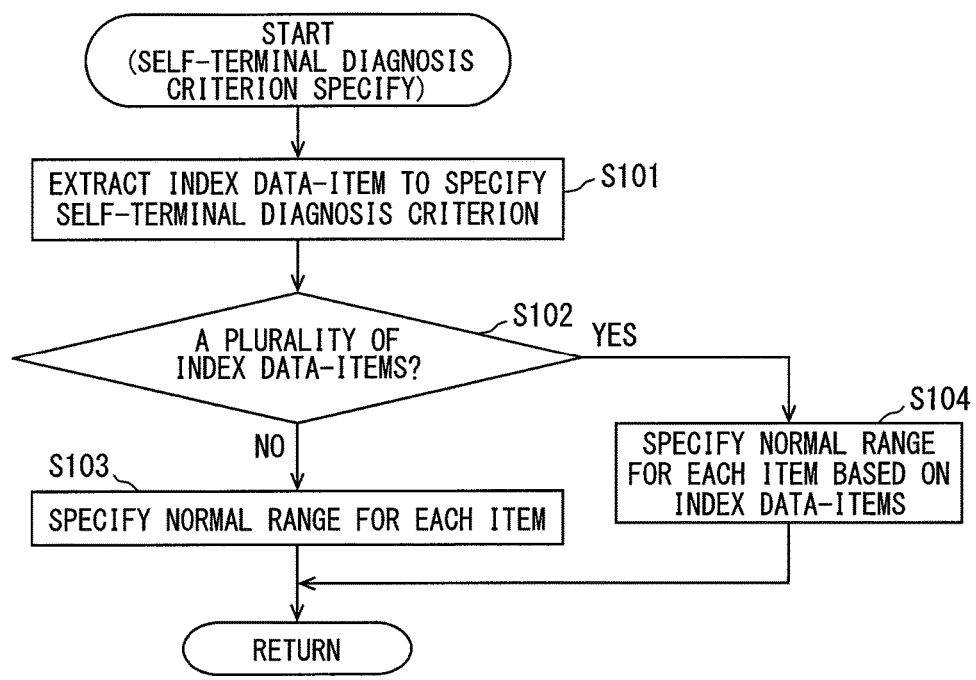
FIG. 6 is a flowchart illustrating a self-terminal diagnosis criterion specification process.

FIG. 6 illustrates a more specific example of the self-terminal diagnosis criterion specification process. At S101, the process extracts an index data-item used as a population to generate the self-terminal diagnosis criterion from index data-items that are received from the nearby in-vehicle unit 1B and are stored in the memory 11M. The process then proceeds to S102.

As an example, the process receives an index data-item from the different in-vehicle unit 1 within a specified time in the past (referred to as population creation time) from the time point when the index data generation section F2 generates an index data-item. The process extracts the received index data-item as a population to specify the self-terminal diagnosis criterion.

The population creation time is favorably set to be relatively short so as to be approximately equal to the first time period or a cycle to transmit an index data-item. The reason follows. As above, the subject vehicle A and the nearby vehicle B are highly likely to exhibit a strongly similar behavior. An operational situation (such as a detection value) of the self sensor is also expected to be strongly similar to an operational situation of a sensor in the nearby in-vehicle unit 1B.

However, output values from the sensors are highly likely to differ from each other if there is a large temporal difference between the time to generate an index data-item for the self terminal and the time to generate an index data-item to be compared. Therefore, the population creation time is favorably as short as possible. Obviously, too short a population creation time decreases the number of index data-items to be extracted as a population. The population creation time may be appropriately specified in consideration of the above trade-off.

Suppose one index data-item is used if there are a plurality of index data-items received from the same in-vehicle unit 1 during the population creation time. Namely, at most one index data-item is used from one in-vehicle unit 1. It may be favorable to appropriately design a criterion to choose one index data-item from a plurality of index data-items received from the same in-vehicle unit 1, if any. The most recent index data-item is used here.

A later part of the description will include a modification of the method to select the index data-item used as a population to specify the self-terminal diagnosis criterion. The example here assumes a population to be index data-items received within the population creation time in the past before the time point when the index data generation section F2 generates an index data-item. However, a population is not limited thereto. A population may use index data-items received during a lapse of the population creation time from the time point when the index data generation section F2 generates an index data-item. Furthermore, a population may use index data-items received within the population creation time before and after the time point when the index data generation section F2 generates an index data-item.

At S102, it is determined whether a plurality of index data-items are extracted at S101. The process proceeds to S104 if a plurality of index data-items are available. The process proceeds to S103 if only one index data-item is available. An error is reported if no index data-item is available. The self-terminal diagnosis criterion specification process and the self-terminal diagnosis process then terminate.

At S103, the process specifies a normal range corresponding to each diagnosis item based on the one index data-item extracted at S101.

For example, a range is used to determine whether the maximum detection value of the acceleration sensor 15 corresponding to each axis direction is normal. Namely, this range corresponds to the normal range of the maximum detection value of the acceleration sensor 15 corresponding to each axis direction. The normal range may be equal to a range specified based on the maximum detection value of the acceleration sensor 15 corresponding to each axis direction in the index data-item extracted at S101.

More specifically, an upper limit of the normal range of the maximum detection value of the acceleration sensor 15 corresponding to each axis direction may be found by adding a predetermined value to the maximum detection value of the acceleration sensor 15 corresponding to each axis direction in the extracted index data-item. A lower limit of the same may be found by subtracting a predetermined value from the maximum detection value of the acceleration sensor 15 corresponding to each axis direction in the extracted index data-item. The predetermined value here may be designed appropriately.

Another mode may multiply the maximum detection value of the acceleration sensor 15 corresponding to each axis direction in the extracted index data-item by a predetermined ratio used to define the upper limit or the lower limit of the normal range and thereby specify the normal range of the maximum detection value of the acceleration sensor 15 corresponding to each axis direction. For example, a range equal to ±30% of the maximum detection value of the acceleration sensor 15 corresponding to each axis direction in the extracted index data-item may be used as the normal range of the maximum detection value of the acceleration sensor 15 corresponding to each axis direction.

The normal range of the other diagnosis items may be similarly specified by adding or subtracting a given value predetermined for each diagnosis item or multiplying a predetermined ratio by the index value for each item in the index data-item extracted at S101. Control returns to the self-terminal diagnosis process as a calling process (S11 in FIG. 5) after the normal range is specified as above for each item (i.e., diagnosis item) in the index data-item.

At S104, the process specifies the normal range for each diagnosis item based on a plurality of index data-items extracted at S101. A difference between S104 and S103 is that the population to specify the self-terminal diagnosis criterion includes one index data-item or a plurality of index data-items.

At S104, the process calculates a representative value for each item in each index data-item based on a plurality of index data-items extracted at S101. A plurality of the index data-items are received from the different nearby in-vehicle units 1B. Even an index value for the same item is supposed to differ (vary) from one index data-item to another. The representative value for a given item representatively indicates a value of the item in each of a plurality of index data-items.

The representative value for a given item may be provided as an average value or a median used in statistics. The representative value may be provided by adding the standard deviation to an average value or adding double the standard deviation to an average value. Any representative value may be appropriately designed for each item. The representative value according to the example uses an average value that is settled as a population corresponding to the value of any of items in each index data-item.

The lower limit of the normal range for each item is assumed to be found by subtracting double the standard deviation from an average for the item. The upper limit of the normal range for each item is assumed to be found by adding double the standard deviation to an average for the item. The method of specifying the normal range for each item is not limited to the above and may be appropriately designed. For example, the representative value for each item may use an average value or a median and then a technology similar to S103 may be used to specify an upper limit or a lower limit of the normal range based on the representative value.

Control returns to the self-terminal diagnosis process (FIG. 5) as a calling process and then proceeds to S11 after the normal range (i.e., the self-terminal diagnosis criterion) is specified for each diagnosis item as above.

At S11, the self-terminal diagnosis test section F6 diagnoses the self sensor using the normal range specified at S10 for each diagnosis item. Namely, it is determined whether the value of each item in the index data-item generated by the index data generation section F2 falls into the normal range corresponding to the item.

For example, the index data-item generated by the index data generation section F2 includes the maximum detection value of the acceleration sensor 15 in the Z-axis direction. It is determined whether this maximum detection value falls into the normal range specified for the maximum detection value of the acceleration sensor 15 in the Z-axis direction.

Various normal ranges are specified based on the index data-item of the nearby in-vehicle unit 1B that exists near the self terminal. Suppose the maximum detection value of the acceleration sensor 15 in the Z-axis direction does not fall into the corresponding normal range. This signifies that the operation of the acceleration sensor 15 differs from an operation tendency of the acceleration sensor 15 in the nearby in-vehicle unit 1.

The case where the operation of the acceleration sensor 15 differs from an operation tendency of the acceleration sensor 15 in the nearby in-vehicle unit 1 suggests that the acceleration sensor 15 is likely to malfunction or the in-vehicle unit 1A is likely to fail to maintain a correct attachment posture in relation to the subject vehicle A. The in-vehicle unit 1A does not maintain correct attachment posture in relation to the subject vehicle A because the Z-axis detection direction of the acceleration sensor 15 in the self terminal deviates from the Z-axis detection direction of the acceleration sensor 15 in the nearby in-vehicle unit 1B.

For example, the Z-axis direction acceleration of the acceleration sensor 15 in the self terminal may indicate a relatively large value even though the acceleration acting in the Z-axis direction on the nearby in-vehicle unit 1B indicates a relatively small value. This suggests that the acceleration sensor 15 fails or detects an acceleration acting in a direction (e.g., front-back direction of the vehicle) that differs from the original detection direction (height direction) as the Z-axis direction.

The process proceeds to S12 on completion of the determination at S11 whether values of all items in the index data-item generated by the index data generation section F2 fall into the range defined by the corresponding normal range.

At S12, it is determined whether an anomaly occurs on any of the self sensors as the result of the determination at S11. A condition (anomaly determination condition) to determine whether an anomaly occurs may be appropriately settled for each sensor. For example, the sensor may be determined to cause an anomaly when at least one of diagnosis items for the sensor deviates from the normal range. The sensor may be determined to cause an anomaly when at least a predetermined number (e.g., three) of diagnosis items for the sensor deviate from the normal range.

The operational situation of the acceleration sensor 15 in the nearby in-vehicle unit 1B may differ from the operational situation of the acceleration sensor 15 of the self terminal also when the subject vehicle A exhibits a behavior such as overtaking different from the nearby vehicle B. An allowable mode may not determine a given sensor to be abnormal by performing the self-terminal diagnosis process only once, but may perform the self-terminal diagnosis process several times and determine that the sensor causes an anomaly when the anomaly determination condition is satisfied for a predetermined number of times.

S12 branches to YES if a sensor determined to be abnormal exists as a result of the determination at S12. The process then proceeds to S13. S12 branches to NO if a sensor determined to be abnormal does not exist as a result of the determination at S12. The flow terminates.

At S13, the self-terminal anomaly notification section F9 requests the wide area communication control section F8 to transmit the self-terminal anomaly notification to the center 3. The wide area communication control section F8 transmits the self-terminal anomaly notification to the center 3 based on the request from the self-terminal anomaly notification section F9 and then terminates the flow.

The above-mentioned mode is capable of specifying the self-terminal diagnosis criterion based on index data-items acquired from a plurality of the nearby in-vehicle units 1B but is not limited thereto. The mode may specify the self-terminal diagnosis criterion always based on the index data-item acquired from one nearby in-vehicle unit 1B. In such a case, the mode may start the self-terminal diagnosis process when acquiring the index data-item from the nearby in-vehicle unit 1B.

(Different-Terminal Diagnosis Process)

Figure 7:
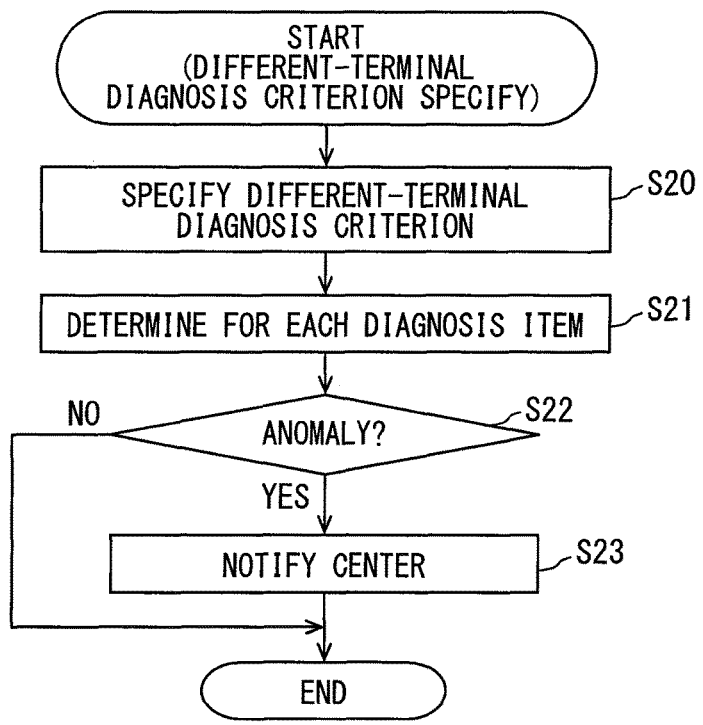
FIG. 7 is a flowchart illustrating a different-terminal diagnosis process performed by the controller.

By using a flowchart in FIG. 7, the description below explains a process (referred to as a different-terminal diagnosis process) performed by the controller 11 to diagnose a sensor in the nearby in-vehicle unit 1B. This flowchart may start at the moment the index data-item is acquired from any nearby in-vehicle unit 1B. Obviously, it may be favorable to appropriately design a condition to start the self-terminal diagnosis process. The self-terminal diagnosis process may start when the index data generation section F2 generates the index data-item.

The self-terminal diagnosis process may start when the nearby in-vehicle unit 1B requests to perform the different-terminal diagnosis process for the nearby in-vehicle unit 1B as a diagnosis target. The self-terminal diagnosis process may also start when starting the vehicle roadside communication with an unshown roadside instrument.

Figure 8:
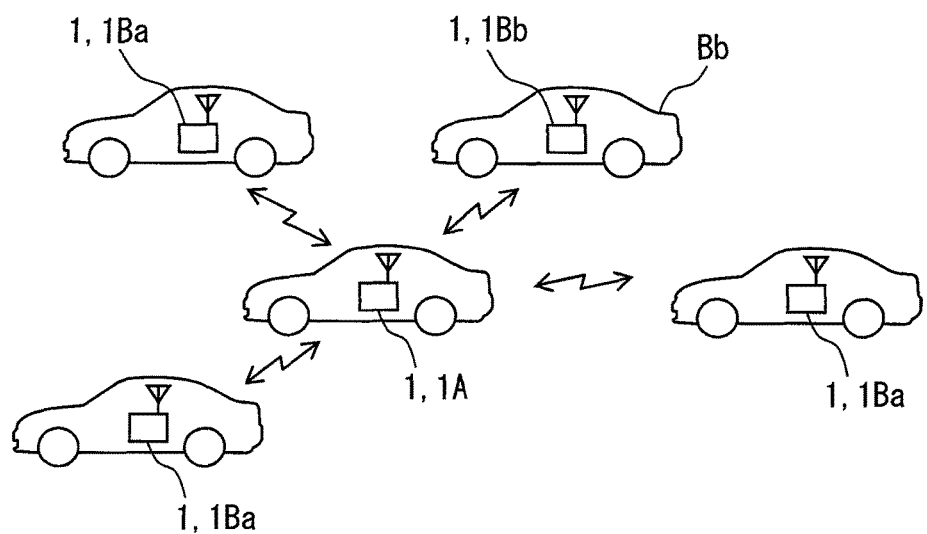
FIG. 8 is a diagram illustrating operation of the different-terminal diagnosis process.

The nearby in-vehicle unit 1B is also represented as a nearby in-vehicle unit 1Bb and a nearby in-vehicle unit 1Ba in the description below, for convenience sake. The nearby in-vehicle unit 1Bb represents the nearby in-vehicle unit 1B as a diagnosis target. The nearby in-vehicle unit 1Ba represents the nearby in-vehicle unit 1B other than the nearby in-vehicle unit 1Bb (see FIG. 8). As described, the in-vehicle unit 1A in FIG. 8 is equal to the in-vehicle unit 1 corresponding to the self terminal. The in-vehicle unit 1A itself performs the different-terminal diagnosis process.

At S20, the normal range specification section F5 performs a different-terminal diagnosis criterion specification process and then proceeds to S21. The different-terminal diagnosis criterion specification process at S20 specifies the normal range for each diagnosis item based on the index data-item received from the nearby in-vehicle unit 1Ba.

The different-terminal diagnosis criterion specification process follows the same procedure as that of the above-mentioned self-terminal diagnosis criterion specification process except that a different index data-item is used as a population to specify a diagnosis criterion. More specifically, the above-mentioned self-terminal diagnosis criterion specification process specifies a diagnosis criterion using an index data-item that is acquired from the nearby in-vehicle unit 1B and satisfies a predetermined condition.

The different-terminal diagnosis criterion specification process specifies a diagnosis criterion using an index data-item that is acquired from the nearby in-vehicle unit 1Ba and satisfies a predetermined condition. Namely, the population to be used corresponds to the index data-item that is received from the nearby in-vehicle unit 1Ba within the population creation time in the past before the time point to have received the index data-item from the nearby in-vehicle unit 1Bb.

The index data-item for the self terminal may be generated within the population creation time in the past before the time point to have received the index data-item from the nearby in-vehicle unit 1Bb. In such a case, the index data-item is also extracted as the population.

The different-terminal diagnosis criterion specification process follows the same procedure as that of the above-mentioned self-terminal diagnosis criterion specification process except the difference described above. The detailed description about the procedure is omitted.

According to the mode, the embodiment does not use an index data-item as the population to specify a different-terminal diagnosis criterion when the index data-item is acquired from the nearby in-vehicle unit 1Bb as a diagnosis target, but is not limited thereto. As another mode, the normal range specification section F5 may specify a different-terminal diagnosis criterion using the index data-item acquired from the nearby in-vehicle unit 1Bb as a diagnosis target.

At S21, the different-terminal diagnosis test section F7 diagnoses a sensor in the nearby in-vehicle unit 1Bb using the normal range for each diagnosis item specified as the different-terminal diagnosis criterion at S20. Namely, when an index data-item is received from the nearby in-vehicle unit 1Bb, it is determined whether a value of each item in the index data-item falls into the normal range corresponding to the item.

Suppose the index data-item received from the nearby in-vehicle unit 1Bb includes detection values of the acceleration sensor 15 in the Z-axis direction. In this case, it is determined whether the maximum detection value of the same falls into the normal range specified for the maxim detection value of the acceleration sensor 15 in the Z-axis direction.

The process proceeds to S22 when completing the determination at S21 whether values of all items in the index data-item acquired from the nearby in-vehicle unit 1Bb fall into the range defined by the corresponding normal range.

At S22, the different-terminal diagnosis test section F7 determines whether an anomaly occurs on any of sensors in the nearby in-vehicle unit 1Bb according to the result from the determination at S21. Namely, it is determined whether a given sensor satisfies a predetermined anomaly determination condition according to the result from the determination at S21.

S22 branches to YES if a sensor determined to be abnormal exists as a result of the determination at S22. The process then proceeds to S23. S22 branches to NO if a sensor determined to be abnormal does not exist as a result of the determination at S22. The flow terminates.

At S23, the different-terminal anomaly notification section F10 requests the wide area communication control section F8 to transmit the different-terminal anomaly notification to the center 3. The wide area communication control section F8 transmits the different-terminal anomaly notification to the center 3 based on the request from the different-terminal anomaly notification section F10 and then terminates the flow.

The above-mentioned mode can specify a different-terminal diagnosis criterion using the index data-item acquired from the other nearby in-vehicle unit 1Ba and also the index data-item of the self terminal, but is not limited thereto. The mode may specify a different-terminal diagnosis criterion based on the index data-item acquired from the in-vehicle unit 1Ba without using the index data-item of the self terminal.

SUMMARY OF THE EMBODIMENT

The above-mentioned configuration determines whether a sensor in the in-vehicle unit 1 as a diagnosis target is normal by comparing the index value indicating operation tendency of the sensor in the in-vehicle unit 1 as a diagnosis target with a diagnosis criterion specified based on the index value indicating the operation tendency of a sensor in at least one in-vehicle unit 1 except the diagnosis target.

More specifically, the process specifies the normal range for each index value based on the index value indicating the operation tendency of a sensor in at least one in-vehicle unit 1 except the diagnosis target (S10, S20). The process then determines whether the index value for the sensor in the in-vehicle unit 1 as the diagnosis target falls into the normal range. It is determined that the sensor does not operate normally if the quantity or type of index values out of the normal range satisfies a predetermined anomaly determination condition (S12, S22).

This mode can more accurately detect an anomaly occurring on the in-vehicle unit without using information about an exterior environment. A more specific description follows.

The above-mentioned exterior environment signifies an environment under which the host vehicle travels. The exterior environment includes a surface shape of a road traveled by the host vehicle, a road shape (curvature), a road gradient, a period of day, and weather. These elements are assumed to be applicable to the subject vehicle A and the nearby vehicle B in common. Accordingly, the elements are also assumed to influence detection values for a sensor of each in-vehicle unit 1 in common.

Namely, the exterior environment similarly influences the detection value for a sensor to be diagnosed and the detection value for a sensor to be used to specify the normal range in order to diagnose the sensor. The normal range used to diagnose sensors therefore reflects an influence of the exterior environment acting on the sensor to be diagnosed.

The subject vehicle A and the nearby vehicle B each travel along a traffic flow and are therefore supposed to exhibit a strongly similar behavior. Particularly, the tendency is expected to be noticeable when the subject vehicle A and the nearby vehicle B operate platooning by using a tracking travel function that becomes popular recently.

Suppose the sensor (e.g., acceleration sensor 15) to detect the same type of physical state quantity normally operates in each in-vehicle unit 1. The operation tendency of each sensor is expected to be highly similar.

That is, suppose the operation tendency of a sensor to detect a given type of physical state quantity in the in-vehicle unit 1 as a diagnosis target differs from the operation tendency of a sensor to detect the same type of physical state quantity in the different in-vehicle unit 1. This signifies that the sensor in the in-vehicle unit 1 as the diagnosis target does not operate normally.

The information used for the above-mentioned diagnosis includes only various index values specified based on a detection value detected by the sensor provided for in the in-vehicle unit 1. Namely, the diagnosis doe not use information outside the in-vehicle unit 1 such as a surface shape of a road traveled by the host vehicle, a road shape (curvature), a road gradient, a period of day, and weather.

The above-mentioned mode therefore need not use information about the exterior environment to detect that the sensor is subject to an anomaly likely to result in a normal operational situation depending on the exterior environment.

The description below explains specific examples to illustrate effects of the embodiment. For example, the illuminance sensor 17 outputs a relatively large detection value in the daytime but outputs a relatively small detection value at night. Therefore, a threshold value corresponding to the period of day needs to be used if an attempt is made to settle the threshold value to determine whether the illuminance sensor 17 malfunctions, based on the magnitude of an output value from the illuminance sensor 17. The in-vehicle unit 1 accordingly needs to acquire the time information or needs to be assigned a plurality of predetermined threshold values corresponding to periods of day.

An output value decreases on a rainy or snowy day compared to a fine day. Sunrise and sunset times vary with the seasons. A threshold value for illuminance therefore needs to correspond to the whether or the season in order to determine whether the illuminance sensor 17 malfunctions. The in-vehicle unit 1 needs to acquire weather information and date information.

As regards this issue, the configuration according to the embodiment does not require the in-vehicle unit 1 to acquire the time information, date information, or weather information, or dynamically use threshold values corresponding to these elements. For example, the illuminance sensor 17 of the in-vehicle unit 1A or the in-vehicle unit 1Ba outputs a sufficiently large illuminance value in the daytime compared to an illuminance value at night. In such a situation, some malfunction can be detected in the illuminance sensor 17 of the nearby in-vehicle unit 1Bb when the illuminance sensor 17 provided for the in-vehicle unit 1Bb outputs a relatively small value.

An output from the illuminance sensor 17 of the nearby in-vehicle unit 1Bb is smaller than an output from the nearby nearby in-vehicle unit 1Ba or the self terminal when the nearby in-vehicle unit 1Bb is mounted with a cover to shield the illuminance sensor 17 of the nearby in-vehicle unit 1Bb from the sunlight or the illuminance sensor 17 malfunctions. The mode illustrated here targets the illuminance sensor 17 of the nearby in-vehicle unit 1Bb at the diagnosis. The same also applies to the illuminance sensor 17 of the self terminal.

The operation tendency of the acceleration sensor 15 is influenced by the smoothness, slope, or curvature of a road traveled by the vehicle that uses the in-vehicle unit 1. As described in the background art above, a situation in which the acceleration sensor 15 detects a vertical acceleration signifies normal operation when the host vehicle travels a rough road or a road on a bridge. However, the same situation signifies an occurrence of anomaly when the host vehicle travels a flat road.

Suppose the in-vehicle unit 1 can acquire information about the road surface situation of a currently traveled road and a predetermined threshold value is provided correspondingly to the road surface situation. The threshold value can be used to determine whether the acceleration sensor 15 operates normally. In this case, however, it is necessary to acquire information about the road surface situation of a road currently traveled by the in-vehicle unit 1 or prepare a plurality of predetermined threshold values corresponding to the road surface situation.

As regards this issue, the configuration according to the embodiment does not require the in-vehicle unit 1 to acquire information about the road surface situation of a road currently traveled by the in-vehicle unit 1 or prepare a plurality of predetermined threshold values corresponding to the road surface situation. A simpler configuration can therefore appropriately determine whether the acceleration sensor 15 operates normally.

The gyro sensor 16 is influenced by the behavior of a vehicle (host vehicle) mounted with the corresponding in-vehicle unit 1. For example, the gyro sensor 16 outputs a relatively large detection value when the vehicle travels an intersection or a curve. The gyro sensor 16 outputs a relatively small detection value when the vehicle travels straight.

Namely, a situation in which the gyro sensor 16 outputs a detection value (including 0) comparable to given magnitude signifies normal operation when the vehicle mounted with the in-vehicle unit 1 travels a curve or turns at an intersection. However, the same situation signifies an occurrence of anomaly when the host vehicle travels straight.

Suppose the in-vehicle unit 1 can acquire information capable of determining whether the host vehicle travels straight. In such a case, it is possible to determine whether the gyro sensor 16 operates normally, based on the magnitude of a detection value output from the gyro sensor 16 and a predetermined threshold value. In this case, however, the in-vehicle unit 1 needs to acquire information capable of determining whether the host vehicle travels straight. The information capable of determining whether the host vehicle travels straight includes the curvature of a traveled road and the vehicle information such as a steering angle and a travel speed.

In contrast, the configuration according to the embodiment does not require the in-vehicle unit 1 to acquire various types of information described above or prepare a plurality of predetermined threshold values corresponding to vehicle behaviors. A simpler configuration can therefore appropriately determine whether the gyro sensor 16 operates normally.

According to the above-mentioned configuration, the in-vehicle unit 1A itself can diagnose various sensors in the self terminal (i.e., by using the self-terminal diagnosis test section F6). Furthermore, the in-vehicle unit 1A can transmit the index data-item and thereby request the diagnosis from the different-terminal diagnosis test section F7 of the different in-vehicle unit 1B.

Therefore, suppose the in-vehicle unit 1A cannot communicate with the center and the sensor of the in-vehicle unit 1A is determined to not operate normally. In such a case, the center 3 can recognize that the sensor of the in-vehicle unit 1A does not operate normally, based on the notification from the in-vehicle unit 1B. The center 3 can take countermeasures such as arranging for personnel to maintain the in-vehicle unit 1A. Unsuccessful communication between the in-vehicle unit 1A and the center 3 signifies that the wide area communicator 13 of the in-vehicle unit 1A fails or the wide area communicator 13 is not provided.

That is, all the in-vehicle units 1 need not include a function to notify the center 3 of an anomaly occurrence on the sensor in any one of the in-vehicle units 1. The in-vehicle unit diagnosis system 100 as a whole may include a certain proportion of the in-vehicle units 1 that have the function to notify the center 3 of an anomaly occurrence on the sensor in any one of the in-vehicle units 1.

While there has been described the embodiment of the present disclosure, the disclosure is not limited to the above-mentioned embodiment. Embodiments described below are also included in the technical scope of the disclosure. Furthermore, the disclosure may be embodied in various modifications without departing from the spirit and scope of the disclosure.

First Modification

As above, any of the in-vehicle units 1 in the in-vehicle unit diagnosis system 100 has the same function but is not limited thereto. Different functions may be provided for the in-vehicle unit 1 to be diagnosed and the diagnosing in-vehicle unit 1.

The in-vehicle unit 1 to be diagnosed just needs to include at least the detection result acquisition section F1, the index data generation section F2, and the short range communication control section F3 having the function to transmit the index data-item of the self terminal.

The diagnosing in-vehicle unit 1 just needs to include at least the short range communication control section F3 having the function to acquire the index data-item transmitted from the in-vehicle unit 1 to be diagnosed, the index data management section F4, the normal range specification section F5, the different-terminal diagnosis test section F7, and the wide area communication control section F8.

According to the above-mentioned configuration, however, the diagnosing in-vehicle unit 1 can diagnose the in-vehicle unit 1 to be diagnosed but cannot diagnose itself or request something else to diagnose itself. Therefore, the diagnosing in-vehicle unit 1 favorably includes the detection result acquisition section F1 and the index data generation section F2 in addition to the above-mentioned minimal configuration. Moreover, the short range communication control section F3 favorably includes a function to transmit the index data-item of the self terminal.

The diagnosing in-vehicle unit 1 can request another diagnosing in-vehicle unit 1 to diagnose itself by transmitting the index data-item of its own even though the self-terminal diagnosis test section F6 is unavailable. The diagnosing in-vehicle unit 1 therefore may not include the self-terminal diagnosis test section F6. Namely, the self-terminal diagnosis test section F6 is an optional element.

Second Modification

The case where the sensor provided for the in-vehicle unit 1 does not operate normally may include a case where the in-vehicle unit 1 is not attached to the vehicle in accordance with a correct posture. The correct posture signifies a predetermined attachment posture.

The self-terminal diagnosis test section F6 may therefore determine whether the attachment posture of the self terminal is correct. The different-terminal diagnosis test section F7 may determine whether the in-vehicle unit 1Bb as a diagnosis target is attached to a vehicle Bb mounted with the in-vehicle unit 1Bb according to the correct posture.

As an example, the description below illustrates a mode in which the self-terminal diagnosis test section F6 of the in-vehicle unit 1A determines whether the attachment posture of the self terminal is correct, based on detection values output from the acceleration sensor 15 in the three axis directions.

The description below first explains the relationship between a travel state of the subject vehicle A and detection values output from the acceleration sensor 15 of the in-vehicle unit 1A in the three axis directions. When the subject vehicle A stops, no force is generated to act on the in-vehicle unit 1A due to acceleration, deceleration, or turning of the subject vehicle A. The magnitude of an acceleration detected by the acceleration sensor 15 is equal to (or almost equal to) a given value, namely, a gravity acceleration ($\approx 9.8$ m/sec$^2$).

The gravity acceleration is resolved into three axis directions corresponding to the posture of the in-vehicle unit 1 with reference to a level plane. That is, when the vehicle stops, a detection value from the acceleration sensor 15 in each axis direction represents the posture of the in-vehicle unit 1 with reference to the level plane. The level plane here signifies a plane perpendicular to the direction in which the gravity acts.

Suppose the in-vehicle unit 1A is configured to be able to recognize that the subject vehicle A stops. In this case, therefore, a possible method may determine whether the attachment posture of the in-vehicle unit 1A is correct with reference to the subject vehicle A, based on whether a detection value from the acceleration sensor 15 in each axis direction, when the vehicle stops, falls into a predetermined range.

However, the same output value is not always acquired from the acceleration sensor 15 in each axis direction even when the subject vehicle A stops. A road gradient influences and varies the ratio of output values from the acceleration sensor 15 in each axis direction when the subject vehicle A exists on a sloped road such as a hill.

Therefore, it is difficult to accurately determine by using a predetermined threshold value whether the in-vehicle unit 1A is attached to the vehicle according to the correct posture even if the in-vehicle unit 1A is configured to be able to recognize that the subject vehicle A stops.

When the subject vehicle A exists on a sloped road, the nearby vehicle B also is highly likely to exist on a similar sloped road. Namely, the road gradient influences not only the acceleration sensor 15 of the self terminal but also the acceleration sensor 15 of the nearby in-vehicle unit 1B.

The road gradient equally influences each of the acceleration sensors 15 of the self terminal and the nearby in-vehicle unit 1 when any of the in-vehicle units 1 is attached to the vehicle according to the correct posture.

In consideration of the foregoing, the self-terminal diagnosis test section F6 determines whether the attachment posture of the self terminal is correct, by comparing a detection value output from the acceleration sensor 15 in each axis direction of a stopped vehicle with detection values output from the acceleration sensor 15 provided for the nearby in-vehicle unit 1B in three axis directions of a stopped vehicle.

Figure 9:
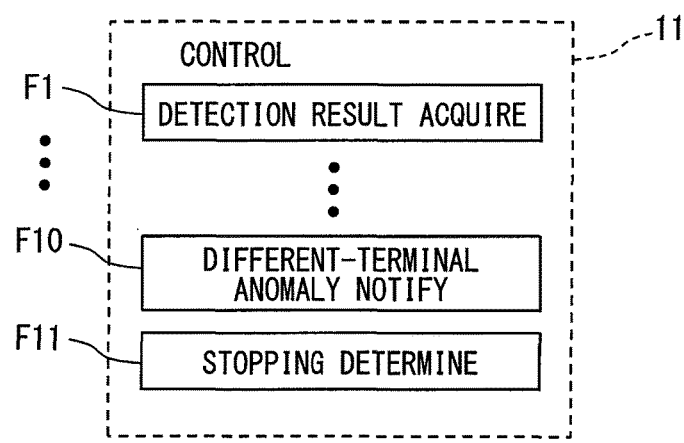
FIG. 9 is a block diagram illustrating an example of a schematic configuration of the controller according to a second modification.

The in-vehicle unit diagnosis system 100 according to the second modification may be configured as follows. As in FIG. 9, the controller 11 of the in-vehicle unit 1A includes a stopping determination section F11, which is also referred to as a stopping determiner, to determine whether the subject vehicle A stops.

The stopping determiner section F11 performs the determination based on a reception situation of the GNSS receiver 14, for example. A distance between the GNSS receiver 14 and a GNSS satellite varies when the in-vehicle unit 1 moves as the subject vehicle A travels. Thus, when the GNSS receiver 14 approaches a given GNSS satellite, the frequency of a carrier wave transmitted from the GNSS satellite becomes higher than a predetermined frequency due to the Doppler effect. When the GNSS receiver 14 moves to leave a given GNSS satellite, the frequency of a carrier wave transmitted from the GNSS satellite becomes lower than the predetermined frequency. As publicly known, the Doppler effect varies the received frequency of a signal transmitted from the GNSS satellite and the variation can be observed as a phase variation in the received signal.

Suppose the GNSS receiver 14 receives a signal from at least one GNSS satellite and no phase variation due to the Doppler effect is observed in a received signal from any GNSS satellite. In this case, the subject vehicle A is determined to stop. Suppose the GNSS receiver 14 receives a signal from at least one GNSS satellite and a phase variation due to the Doppler effect is observed in a received signal from any of the acquired GNSS satellites. In this case, the subject vehicle A is determined not to stop. The mode may not perform the above-mentioned determination or may determine that the vehicle does not stop when the GNSS receiver 14 acquires no GNSS satellite.

The stopping determiner section F11 may determine that the subject vehicle A does not move when a current position output from the GNSS receiver 14 indicates the same (or almost the same) position as the previously output position information.

Suppose the stopping determiner section F11 determines that the subject vehicle A stops. In this case, the index data generation section F2 transmits a detection value output from the acceleration sensor 15 in each axis direction while the determination is maintained. The stopping determiner section F11 transmits the detection value in the index data-item. This detection value is referred to as posture information, namely, a detection value that is output from the acceleration sensor 15 in each axis direction and is included in the index data-item.

There has been described the configuration of the in-vehicle unit 1A mounted on the vehicle A. A similar configuration is applied to the in-vehicle unit 1B mounted on the nearby vehicle B. Suppose the in-vehicle unit 1B includes the stopping determiner section F11 to determine whether the vehicle mounted with the self terminal stops. Furthermore, suppose the stopping determiner section F11 determines that the vehicle stops. In this case, the in-vehicle unit 1B is supposed to transmit the index data-item including the posture information.

Suppose the normal range specification section F5 receives the index data-item including the posture information from the nearby in-vehicle unit 1B. In this case, the normal range specification section F5 specifies the normal range for the attachment posture based on the posture information. For example, the normal range for the attachment posture may be found by adding a predetermined margin (e.g., ±20%) to the detection value in the received posture information in each axis direction.

Suppose the index data-item generated by the index data generation section F2 of the self terminal includes the posture information and the normal range specification section F5 specifies the normal range for the attachment posture based on the posture information acquired from the nearby in-vehicle unit 1B. In this case, the self-terminal diagnosis test section F6 determines whether the detection value indicated by the posture information about the self terminal in each axis direction falls into the normal range.

Suppose the detection value indicated by the posture information about the self terminal in each axis direction does not fall into the normal range. In this case, the self-terminal diagnosis test section F6 determines that the attachment posture of the self terminal is incorrect. Suppose the detection value indicated by the posture information about the self terminal in each axis direction falls into the normal range. In this case, the self-terminal diagnosis test section F6 determines that the attachment posture of the self terminal is correct. When the attachment posture of the self terminal is determined to be incorrect, the self-terminal anomaly notification section F9 performs the process to notify the center 3 that the attachment posture of the self terminal is incorrect.

The configuration of the second modification can determine whether the attachment posture of the self terminal is correct, in consideration of a road gradient.

While there has been illustrated the mode in which the self-terminal diagnosis test section F6 determines the attachment posture of the self terminal, the same applies to a method of determining whether the attachment posture of the nearby in-vehicle unit 1Bb as a specified diagnosis target is correct. The normal range specification section F5 may determine the normal range for an attachment posture based on the posture information in the index data-item received from the nearby in-vehicle unit 1Ba. The normal range specification section F5 may also determine the normal range for an attachment posture based on the posture information in the index data-item generated by the index data generation section F2 of the self terminal.

The different-terminal diagnosis test section F7 may determine whether the nearby in-vehicle unit 1Bb is attached according to a correct posture by comparing the posture information in the index data-item acquired from the nearby in-vehicle unit 1Bb as a diagnosis target with the normal range for the attachment posture specified by the normal range specification section F5.

Third Modification

The second modification illustrates the mode in which each in-vehicle unit 1 includes the GNSS receiver 14 and the stopping determiner section F11 and uses a result detected by the acceleration sensor 15 while the vehicle stops to determine whether the in-vehicle unit 1 is attached according to the correct attachment posture. However, the mode is not limited thereto.

The in-vehicle unit 1 may not include the GNSS receiver 14 and the stopping determiner section F11 and use a median in the index data-item for the acceleration sensor 15 in each axis direction to determine whether the attachment posture of the self terminal or the nearby in-vehicle unit 1B is correct in relation to the vehicle. The description below illustrates a mode in which the self-terminal diagnosis test section F6 of the in-vehicle unit 1A determines whether the attachment posture of the self terminal is correct.

As described in the second modification, no force is generated to act on the in-vehicle unit 1A due to acceleration, deceleration, or turning of the subject vehicle A when the subject vehicle A stops. The magnitude of an acceleration (hereinafter referred to as a detected-acceleration absolute value) detected by the acceleration sensor 15 is equal to (or almost equal to) a gravity acceleration. Obviously, the detected-acceleration absolute value is equal to the gravity acceleration when the subject vehicle A is conducting translatory movement.

Paradoxically, the subject vehicle A is likely to stop or conduct the translatory movement when the detected-acceleration absolute value is equal to the gravity acceleration. The detected-acceleration absolute value results from the square root of the sum of the squares of a detection value in each axis direction.

The subject vehicle A does not always stop or conduct the translatory movement only because the detected-acceleration absolute value of the acceleration sensor 15 is equal to the gravity acceleration.

If an anomaly occurs on the acceleration sensor 15, a force resulting from acceleration, deceleration, or turning of the subject vehicle A may accidentally cause the detected-acceleration absolute value to be equal to the gravity acceleration.

When the nearby vehicle B stops, the subject vehicle A is highly likely to stop, too. When the nearby vehicle B travels straight at a constant speed, the subject vehicle A is highly likely to travel straight at a constant speed, too. All the detected-acceleration absolute values of the acceleration sensors 15 in a plurality of the in-vehicle units 1 are less likely to be accidentally equal to the gravity acceleration.

Suppose all (or part of) detected-acceleration absolute values detected by the acceleration sensor 15 is equal to the gravity acceleration when the acceleration sensor 15 is included in the self terminal and each of the in-vehicle units 1B existing near the self terminal. In this case, the subject vehicle A and the nearby vehicle B can be assumed to stop or conduct the translatory movement.

Suppose the subject vehicle A and the nearby vehicle B stop or conduct the translatory movement. In this case, as above, the detection value output from the acceleration sensor 15 in each axis direction represents the posture of each in-vehicle unit 1 in relation to the level plane influenced by a road gradient.

In consideration of the foregoing, the self-terminal diagnosis test section F6 can determine whether the attachment posture of the self terminal is correct, by comparing detection results from the acceleration sensors 15 of the self terminal and the nearby in-vehicle unit 1B whose detected-acceleration absolute values are each equal to the gravity acceleration.

The in-vehicle unit diagnosis system 100 according to the third modification may be configured as follows. The detection result acquisition section F1 calculates a detected-acceleration absolute value from a detection result each time the detection result acquisition section F1 acquires the detection result from the acceleration sensor 15. The detection result acquisition section F1 then stores the detected-acceleration absolute value in the memory 11M. The index data generation section F2 generates a detected-acceleration absolute value corresponding to the most recent detection result and an index data-item including the detection value in each axis direction as an origin of the detected-acceleration absolute value.

The self-terminal diagnosis test section F6 determines whether a plurality of index data-items are extracted at S101 in FIG. 6 and all (or at least a predetermined rate of) the detected-acceleration absolute values are equal to the gravity acceleration. The detected-acceleration absolute values of a plurality of index data-items may be equal to the gravity acceleration. In this case, the self-terminal diagnosis test section F6 further determines whether the detected-acceleration absolute value in the index data-item for the self terminal is also equal to the gravity acceleration.

The detected-acceleration absolute value in the index data-item for the self terminal may also be equal to the gravity acceleration. In such a case, the self-terminal diagnosis test section F6 compares the detection value in the index data-item of the self terminal in each axis direction with the detection value in the index data-item acquired from the nearby in-vehicle unit 1B in each axis direction.

As a result of the comparison, a difference between the detection values in each axis direction may fall into a predetermined allowable range. In this case, the attachment posture of the self terminal is determined to be correct. As a result of the comparison, a difference between the detection values in each axis direction may not fall into a predetermined allowable range. In this case, the attachment posture of the self terminal is determined not to be correct. When the attachment posture of the self terminal is determined not to be correct, the self-terminal anomaly notification section F9 performs a process to notify the center 3 that the attachment posture of the self terminal is not correct.

There has been illustrated the mode in which the self-terminal diagnosis test section F6 determines whether the attachment posture of the self terminal is correct. However, the different-terminal diagnosis test section F7 may follow a procedure similar to the above to determine whether the nearby in-vehicle unit 1Bb as a diagnosis target maintains a correct attachment posture. In this case, the index data-item as a diagnosis target is acquired by replacing the index data-item of the self terminal with the index data-item acquired from the nearby in-vehicle unit 1Bb as the diagnosis target.

The above-mentioned configuration according to the third modification can determine whether the self terminal or the nearby in-vehicle unit 1Bb maintains a correct attachment posture, even when the GNSS receiver 14 acquires no GNSS satellite. Similarly to the second modification, the above-mentioned method can reduce a possibility of incorrectly determining the attachment posture due to the influence of a road gradient.

Fourth Modification

The above-mentioned embodiment assumes the population of index data-items to specify a self-terminal diagnosis criterion to be index data-items received from the nearby in-vehicle unit 1B within a predetermined time with reference to the time point when the index data generation section F2 generates the index data-item. However, the embodiment is not limited thereto.

The configuration may use index data-items as the population under condition that the index data-items satisfy the above-mentioned requirements and are acquired from the nearby in-vehicle unit 1B existing within a predetermined distance from the self terminal. As mentioned in the opening sentence, the subject vehicle A and the nearby vehicle B are highly likely to exhibit a strongly similar behavior (such as acceleration, deceleration, or turn). The similarity is expected to be stronger as the nearby vehicle B approaches the subject vehicle A. Namely, suppose index data-item is received from the in-vehicle unit 1B existing within a predetermined distance from the self terminal among the nearby in-vehicle units 1B. The received index data-item can be used as the population to specify a self-terminal diagnosis criterion to improve the accuracy of the self-terminal diagnosis process.

The fourth modification may be configured as follows. The short range communication control section F3 of each in-vehicle unit 1 transmits the index data-item supplemented with a header including the terminal ID and the position information (latitude, longitude, and height) indicating the current position specified based on a detection result from the GNSS receiver 14.

The short range communication control section F3 receives data including the index data-item transmitted from the nearby in-vehicle unit 1B. The short range communication control section F3 extracts the index data-item, the terminal ID representing the in-vehicle unit 1 as a transmission origin, and the position information from the received data and supplies these to the index data management section F4.

The index data management section F4 acquires the index data-item, the terminal ID, and the position information from the short range communication control section F3 and stores the index data-item, the terminal ID, and the position information associated with each other in the memory 11M.

The normal range specification section F5 may use index data-items as the population to specify a self-terminal diagnosis criterion during the self-terminal diagnosis criterion specification process. Such used index data-items may be index data-items received from any different in-vehicle unit 1B existing within a predetermined distance from the self terminal, among the index data-items received from any different in-vehicle unit 1B within the population creation time in the past before the time point when the index data generation section F2 generates the index data-item.

The current position of the self terminal may be specified based on the position information supplied from the GNSS receiver 14. The distance between the self terminal and each in-vehicle unit 1B may be calculated from a difference between: the latitude and the longitude of the self terminal; and the latitude and the longitude in the position information associated with the index data-item received from the in-vehicle unit 1B. The predetermined distance here may be assumed to be 25 m or 50 m, for example.

There has been illustrated the mode of extracting the index data-item used as the population to specify a self-terminal diagnosis criterion. The same applies to a mode of extracting the index data-item used as the population to specify a different-terminal diagnosis criterion.

Namely, the normal range specification section F5 may extract index data-items as the population in the different-terminal diagnosis criterion specification process. Such extracted index data-items may be index data-items received from any different in-vehicle unit 1Ba existing within a predetermined distance from the current position of the nearby in-vehicle unit 1Bb as a diagnosis target, among the index data-items received from the different in-vehicle unit 1Ba within the population creation time in the past before the time point to have received the index data-item from the in-vehicle unit 1Bb. Suppose that the current position of the self terminal exists within a predetermined distance from the current position of the in-vehicle unit 1Bb and the index data generation section F2 generates an index data-item within the population creation time in the past before the time point to have received an index data-item from the in-vehicle unit 1Bb. In such a case, such a generated index data-item may be included as the population.

The mode may select an index data-item to specify various diagnosis criteria depending on a distance between the in-vehicle units 1 without using requirements for the time point to acquire the index data-item.

Fifth Modification

The fourth modification illustrates the mode that selects an index data-item used for the normal range specification section F5 to specify various diagnosis criteria from an index data-item acquired from the in-vehicle unit 1B or an index data-item of the self terminal based on the distance from the in-vehicle unit 1 as a diagnosis target. However, the mode is not limited thereto. For example, the normal range specification section F5 may use index data-items as the population when the index data-items are acquired from the in-vehicle unit 1 existing at the same height as the in-vehicle unit 1 as a diagnosis target.

For example, a difference in the behavior is assumed between a vehicle traveling an elevated highway such as an expressway and a vehicle traveling a road extending below the elevated highway. Therefore, the mode may not use an index data-item as the population to specify a diagnosis criterion when the index data-item is acquired from the in-vehicle unit 1 causing a height equal to at least a predetermined value from the in-vehicle unit 1 as a diagnosis target based on information about the height positioned at the in-vehicle unit 1. The normal range can be thereby specified more appropriately.

The fifth modification may be implemented in the mode similar to the fourth modification. Namely, the height positioned at the nearby in-vehicle unit 1B may be specified based on position information associated with the index data-item. The height positioned at the self terminal may be specified based on a detection result from the GNSS receiver 14.

Sixth Modification

Moreover, the normal range specification section F5 may specify a diagnosis criterion based on the index data-item acquired from the in-vehicle unit 1 that moves in the same (or almost same) direction as the movement direction of the in-vehicle unit 1 as a diagnosis target. As mentioned in the opening sentence, the subject vehicle A and the nearby vehicle B are highly likely to exhibit a strongly similar behavior (such as acceleration, deceleration, or turn). However, this does not apply to the in-vehicle unit 1 whose movement direction is different.

The vehicle mounted with the in-vehicle unit 1 as a diagnosis target is highly likely to behave differently from a vehicle traveling a lane opposite the lane traveled by that vehicle or a vehicle moving in another direction near an intersection. Therefore, the determination accuracy can be improved by not using an index data-item as the population to specify a diagnosis criterion when the index data-item is acquired from the in-vehicle unit 1 moving in a direction different from the movement direction of the in-vehicle unit 1 as a diagnosis target.

The movement direction of the in-vehicle unit 1 may be specified based on the Doppler effect of signals received by the GNSS receiver 14 as described in the third modification, for example. The publicly known technology provides a method of finding the movement direction on a level plane based on a frequency change that occurs due to the Doppler effect in a signal received by the GNSS receiver 14.

The sixth modification may be configured as follows. The short range communication control section F3 of each in-vehicle unit 1 transmits the intended index data-item supplemented with a header including the terminal ID and information indicating the movement direction of the self terminal specified based on a frequency change in the signal received by the GNSS receiver 14.

The short range communication control section F3 acquires data including the index data-item transmitted from the in-vehicle unit 1. The short range communication control section F3 extracts the index data-item, the terminal ID representing the in-vehicle unit 1 as a transmission origin, and the movement direction from the received data and supplies these to the index data management section F4.

The index data management section F4 acquires the index data-item as well as the terminal ID and the position information associated with the index data-item from the short range communication control section F3 and stores the index data-item, the terminal ID, and the position information associated with each other in the memory 11M.

The normal range specification section F5 uses index data-items as the population when the index data-items are acquired from the in-vehicle unit 1 that moves in the same direction as the movement direction of the in-vehicle unit 1 as a diagnosis target. Obviously, a diagnosis criterion may be specified based on index data-items that are: acquired from the in-vehicle unit 1 whose movement direction is equal to that of the in-vehicle unit 1 as a diagnosis target; and acquired within the population creation time in the past before the time point to have acquired the index data-item for the in-vehicle unit 1 as a diagnosis target, similarly to the above-mentioned embodiment.

Seventh Modification

There has been illustrated the mode in which the in-vehicle unit 1 includes the different-terminal diagnosis test section F7. However, the mode is not limited thereto. The mode may allow a roadside instrument to include the short range communication control section F3 to receive the index data-item transmitted from the in-vehicle unit 1, the index data management section F4, the normal range specification section F5, the different-terminal diagnosis test section F7, and the wide area communication control section F8.

Namely, the roadside instrument may determine whether a sensor in the in-vehicle unit 1 is normal when the roadside instrument performs roadside communication with the in-vehicle unit 1.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. An in-vehicle unit used in each of a plurality of host vehicles, the host vehicles including a subject vehicle and a plurality of nearby vehicles near the subject vehicle,
   the in-vehicle unit performing inter-vehicle communication,
   each in-vehicle unit comprising:
   a wireless communicator that transmits and receives information using inter-vehicle communication;
   a sensor instrument that detects a predetermined physical state quantity acting on each in-vehicle unit; and
   an index data generation section that generates an index data-item including an index value indicating an operational situation of the sensor instrument based on a detection result from the sensor instrument, the generated index data-item being transmitted via the wireless communicator,
   a subject in-vehicle unit that serves as the in-vehicle unit used in the subject vehicle, the subject in-vehicle unit further comprising:
   a communication processing section that makes the wireless communicator acquire a different-unit index data-item as the index data-item transmitted from a plurality of nearby in-vehicle units as the in-vehicle units in the nearby vehicles;
   a determination criterion specification section that successively specifies a different-unit determination criterion as a determination criterion to determine whether a different sensor instrument as the sensor instrument included in a target nearby in-vehicle unit operates normally, based on the different-unit index data-item acquired by the communication processing section,
      the target nearby in-vehicle unit serving as a predetermined diagnosis target among the nearby in-vehicle units; and
   a different-unit diagnosis test section that determines whether the different sensor instrument in the target nearby in-vehicle unit operates normally, by comparing the different-unit determination criterion specified by the determination criterion specification section with the different-unit index data-item acquired by the communication processing section from the target nearby in-vehicle unit.

2. An in-vehicle unit used in each of a plurality of host vehicles, the host vehicles including a subject vehicle and at least one nearby vehicle near the subject vehicle, the in-vehicle unit performing inter-vehicle communication,
   each in-vehicle unit comprising:
   a wireless communicator that transmits and receives information using inter-vehicle communication;
   a sensor instrument that detects a predetermined physical state quantity acting on each in-vehicle unit; and
   an index data generation section that generates an index data-item including an index value indicating an operational situation of the sensor instrument based on a detection result from the sensor instrument, the generated index data-item being transmitted via the wireless communicator,
   a subject in-vehicle unit that serves as the in-vehicle unit used in the subject vehicle, the subject in-vehicle unit further comprising:
   a communication processing section that makes the wireless communicator acquire a different-unit index data-item as the index data-item transmitted from at least one nearby in-vehicle unit as the in-vehicle unit in the at least one nearby vehicle;
   a determination criterion specification section that successively specifies a self-unit determination criterion as a determination criterion to determine whether the sensor instrument in the subject in-vehicle unit operates normally, based on the different-unit index data-item acquired by the communication processing section; and
   a self-unit diagnosis test section that determines whether the sensor instrument in the subject in-vehicle unit operates normally, by comparing the self-unit determination criterion specified by the determination criterion specification section with a self-unit index data-item as the index data-item in the subject in-vehicle unit.

3. The in-vehicle unit according to claim 2,
wherein:

the subject in-vehicle unit includes the determination criterion specification section successively that specifies a different-unit determination criterion as a determination criterion to determine whether a different sensor instrument as the sensor instrument included in a target nearby in-vehicle unit operates normally, based on the different-unit index data-item acquired by the communication processing section, the target nearby in-vehicle unit serving as a predetermined diagnosis target among the at least one nearby in-vehicle unit; and the subject in-vehicle unit further includes a different-unit diagnosis test section that determines whether the different sensor instrument in the target nearby in-vehicle unit operates normally, by comparing the different-unit determination criterion specified by the determination criterion specification section with the different-unit index data-item acquired by the communication processing section from the target nearby in-vehicle unit.

4. The in-vehicle unit according to claim 3, wherein the subject in-vehicle unit includes:

a wide area communicator that communicates, with a center installed outside remotely, via a wide area communication network; and a different-unit anomaly notification section that makes the wide area communicator notify the center that the different sensor instrument in the target nearby in-vehicle unit does not operate normally in response to the different-unit diagnosis test section determining that the different sensor instrument in the target nearby in-vehicle unit does not operate normally.

5. The in-vehicle unit according to claim 3, wherein the in-vehicle unit used in each host vehicle further includes a position information output interface that detects a current position of each in-vehicle unit itself and successively outputs position information indicating a detected current position, the outputted position information including height information indicating a height at which each in-vehicle unit is positioned with reference to a predetermined reference level, the outputted position information being transmitted to be associated with the index data-item, when the index data-item is transmitted via the wireless communicator, wherein in the subject in-vehicle unit:

the communication processing section acquires the different-unit index data-item that is transmitted from the at least one nearby in-vehicle unit and is associated with position information indicating the current position; and the determination criterion specification section specifies the different-unit determination criterion based on the different-unit index data-item acquired from the at least one nearby in-vehicle unit that is positioned at a height equal to a height at which the target nearby in-vehicle unit is positioned.

6. The in-vehicle unit according to claim 2, wherein the subject in-vehicle unit includes:

a wide area communicator that communicates with a center installed outside remotely via a wide area communication network; and a self-terminal anomaly notification section that makes the wide area communicator notify the center that the sensor instrument in the subject in-vehicle unit does not operate normally in response to the self-unit diagnosis test section determining that the sensor instrument does not operate normally.

7. The in-vehicle unit according to claim 6, wherein in each in-vehicle unit used in each host vehicle:

the sensor instrument includes an acceleration sensor that detects an acceleration acting on each of three axis directions orthogonal to each other; and the index data-item includes an acceleration detected by the acceleration sensor in each axis direction;

wherein in the subject in-vehicle unit:

the determination criterion specification section specifies a determination criterion that determines whether the subject in-vehicle unit itself is attached to the subject vehicle according to a predetermined posture, based on an acceleration in each axis direction included in the different-unit index data-item acquired from the at least one nearby in-vehicle unit;

the self-unit diagnosis test section determines whether the subject in-vehicle unit itself is attached to the subject vehicle according to a predetermined posture, by comparing the determination criterion specified by the determination criterion specification section with the acceleration in each axis direction included in the index data-item; and the self-terminal anomaly notification section makes the wide area communicator notify the center that the subject in-vehicle unit is not attached to the subject vehicle according to a predetermined posture in response to the self-unit diagnosis test section determining that the subject in-vehicle unit itself is not attached to the subject vehicle according to the predetermined posture.

8. The in-vehicle unit according to claim 2, wherein each in-vehicle unit used in each host vehicle includes a position information output interface that detects a current position of each in-vehicle unit itself and successively outputs position information indicating a detected current position, the outputted position information including height information indicating a height at which each in-vehicle unit itself is positioned with reference to a predetermined reference level, the outputted position information being transmitted to be associated with the index data-item, when the index data-item is transmitted, wherein in the subject in-vehicle unit:

the communication processing section acquires the different-unit index data-item that is transmitted from the at least one nearby in-vehicle unit and is associated with position information indicating the current position; and the determination criterion specification section specifies the self-unit determination criterion based on the different-unit index data-item acquired from the at least one nearby in-vehicle unit positioned at a height equal to a height at which the subject in-vehicle unit is positioned.

9. An in-vehicle diagnosis system having a plurality of in-vehicle units respectively provided in a plurality of host vehicles that include a subject vehicle and at least one nearby vehicle near the subject vehicle,
  each in-vehicle unit comprising:
    a wireless communicator that transmits and receives information using inter-vehicle communication;
    a sensor instrument that detects a predetermined physical state quantity acting on each in-vehicle unit;
    an index data generation section that generates an index data-item including an index value indicating an operational situation of the sensor instrument based on a detection result from the sensor instrument;
    a communication processing section that makes the wireless communicator
      transmit the generated index data-item and
      acquire a different-unit index data-item as the index data-item transmitted from at least one nearby in-vehicle unit as the in-vehicle unit in the at least one nearby vehicle;
    a determination criterion specification section that successively specifies a different-unit determination criterion as a determination criterion to determine whether a different sensor instrument as the sensor instrument included in a target nearby in-vehicle unit operates normally, based on the different-unit index data-item acquired by the communication processing section,
      the target nearby in-vehicle unit serving as a predetermined diagnosis target among the at least one nearby in-vehicle unit; and
    a different-unit diagnosis test section that determines whether the different sensor instrument in the target nearby in-vehicle unit operates normally, by comparing the different-unit determination criterion specified by the determination criterion specification section with the different-unit index data-item acquired by the communication processing section from the target nearby in-vehicle unit.

\* \* \* \* \*